US008903825B2

(12) United States Patent
Parker et al.

(10) Patent No.: US 8,903,825 B2
(45) Date of Patent: Dec. 2, 2014

(54) SEMIOTIC INDEXING OF DIGITAL RESOURCES

(75) Inventors: Charles T. Parker, East Lansing, MI (US); George M. Garrity, Okemos, MI (US)

(73) Assignee: NamesforLife LLC, East Lansing, MI (US)

( * ) Notice: Subject to any disclaimer, the term of this patent is extended or adjusted under 35 U.S.C. 154(b) by 41 days.

(21) Appl. No.: 13/478,973

(22) Filed: May 23, 2012

(65) Prior Publication Data

US 2013/0013603 A1 Jan. 10, 2013

Related U.S. Application Data

(60) Provisional application No. 61/489,362, filed on May 24, 2011.

(51) Int. Cl.
*G06F 17/30* (2006.01)

(52) U.S. Cl.
CPC ...... *G06F 17/30707* (2013.01); *G06F 17/3071* (2013.01)
USPC ............... 707/737; 707/801; 707/E17.089

(58) Field of Classification Search
CPC .............. G06F 17/30705; G06F 17/30707
USPC ............... 707/737, 738, 801, 740, E17.089
See application file for complete search history.

(56) References Cited

U.S. PATENT DOCUMENTS

| | | | |
|---|---|---|---|
| 6,249,784 B1 | 6/2001 | Macke et al. | |
| 6,327,334 B1 * | 12/2001 | Murray et al. | 378/75 |
| 6,397,215 B1 * | 5/2002 | Kreulen et al. | 715/259 |
| 6,442,545 B1 | 8/2002 | Feldman et al. | |
| 6,535,819 B1 * | 3/2003 | Clark | 702/19 |
| 6,990,628 B1 * | 1/2006 | Palmer et al. | 715/234 |
| 7,243,092 B2 | 7/2007 | Woehler et al. | |
| 7,562,066 B2 * | 7/2009 | Kawatani | 707/999.003 |
| 7,925,444 B2 | 4/2011 | Garrity et al. | |
| 2003/0167283 A1 | 9/2003 | Remsen et al. | |
| 2003/0207806 A1 * | 11/2003 | Ensign et al. | 514/12 |
| 2004/0024739 A1 | 2/2004 | Copperman et al. | |
| 2004/0098271 A1 | 5/2004 | Hicks et al. | |
| 2004/0103108 A1 * | 5/2004 | Andreev et al. | 707/100 |

(Continued)

OTHER PUBLICATIONS

Guido Sautter, Klemens Bohm, and Donal Agosti, "A combining approach to Find All taxon names (FAT) in legacy biosystematics literature" (2006) Biodiversity Informatics, 3, pp. 46-58.

(Continued)

*Primary Examiner* — Phong Nguyen
(74) *Attorney, Agent, or Firm* — Michael Best & Friedrich LLP

(57) ABSTRACT

A method of classifying a plurality of documents. The method includes steps of providing a first set of classification terms and a second set of classification terms, the second set of classification terms being different from the first set of classification terms; generating a first frequency array of a number of occurrences of each term from the first set of classification terms in each document; generating a second frequency array of a number of occurrences of each term from the second set of classification terms in each document; generating a first similarity matrix from the first frequency array; generating a second similarity matrix from the second frequency array; determining an entrywise combination of the first similarity matrix and the second similarity matrix; and clustering the plurality of documents based on the result of the entrywise combination.

48 Claims, 16 Drawing Sheets

(56) References Cited

U.S. PATENT DOCUMENTS

| | | | |
|---|---|---|---|
| 2005/0014195 A1* | 1/2005 | Vauterin et al. | 435/7.1 |
| 2005/0114382 A1* | 5/2005 | Lakshminarayan et al. | 707/102 |
| 2005/0149269 A1 | 7/2005 | Thomas et al. | |
| 2005/0149494 A1* | 7/2005 | Lindh et al. | 707/3 |
| 2005/0160059 A1 | 7/2005 | Garrity et al. | |
| 2006/0080314 A1 | 4/2006 | Hubert et al. | |
| 2006/0136478 A1* | 6/2006 | Berkner | 707/102 |
| 2006/0206512 A1 | 9/2006 | Hanrahan et al. | |
| 2006/0223159 A1* | 10/2006 | Pfeiffer et al. | 435/252.1 |
| 2007/0046672 A1 | 3/2007 | Shinohara et al. | |
| 2007/0180388 A1 | 8/2007 | Izhikevich | |
| 2007/0288185 A1* | 12/2007 | Burch et al. | 702/81 |
| 2008/0052289 A1 | 2/2008 | Kolo et al. | |
| 2008/0114564 A1 | 5/2008 | Ihara | |
| 2008/0228724 A1* | 9/2008 | Huang et al. | 707/3 |
| 2009/0037390 A1* | 2/2009 | Handley | 707/3 |
| 2009/0271433 A1* | 10/2009 | Perronnin et al. | 707/103 R |
| 2009/0299926 A1 | 12/2009 | Garrity et al. | |
| 2010/0159438 A1* | 6/2010 | German et al. | 434/433 |
| 2010/0198841 A1 | 8/2010 | Parker et al. | |
| 2010/0279402 A1* | 11/2010 | Yamada et al. | 435/366 |
| 2010/0306147 A1 | 12/2010 | Platt et al. | |
| 2011/0040752 A1* | 2/2011 | Svore et al. | 707/728 |
| 2011/0066968 A1 | 3/2011 | Goldsmith et al. | |
| 2011/0224911 A1* | 9/2011 | Ostrander et al. | 702/19 |
| 2011/0295612 A1* | 12/2011 | Donneau-Golencer et al. | 705/1.1 |
| 2012/0143795 A1* | 6/2012 | Han et al. | 706/12 |

OTHER PUBLICATIONS

International Search Report and Written Opinion for Application No. PCT/US2010/020734 dated Mar. 9, 2010 (9 pages).

United States Patent Office Action for U.S. Appl. No. 12/685,964 dated Dec. 12, 2012 (15 pages).

Extended European Search Report for Application No. 10729654.3 dated Dec. 14, 2012 (9 pages).

Corbett et al., "High-Throughput Identification of Chemistry in Life Science Texts," Computational Life Science; Lecture Notes in Bioinformatics; LNCS, Springer, Jan. 1, 2006, pp. 107-118, Germany.

PCT/US2012/039168 International Search Report and Written Opinion dated Aug. 1, 2012 (8 pages).

* cited by examiner

|          | Y02E50 | Y02E50 | C12P7 | C12R1 | C10L1 | T01M8 | H01M8 | M01M4 | T01M4 |
|----------|--------|--------|-------|-------|-------|-------|-------|-------|-------|
| US 7629170 | 0 | 0 | 0 | 0 | 0 | 0 | 0 | 0 | 0 |
| US 7687161 | 0 | 1 | 0 | 0 | 0 | 1 | 1 | 1 | 1 |
| US 7704723 | 0 | 1 | 1 | 1 | 0 | 0 | 0 | 0 | 0 |
| US 7625728 | 0 | 1 | 1 | 0 | 0 | 0 | 0 | 0 | 0 |
| US 7700332 | 0 | 0 | 0 | 0 | 0 | 0 | 0 | 0 | 0 |
| US 7682812 | 0 | 1 | 1 | 0 | 0 | 0 | 0 | 0 | 0 |
| US 7666637 | 0 | 1 | 1 | 0 | 0 | 0 | 0 | 0 | 0 |
| US 7662617 | 0 | 1 | 1 | 0 | 1 | 0 | 0 | 0 | 0 |

Table 411. Classification code boolean matrix.

| documentId | Classification Set |
|------------|--------------------|
| US 7629170 | {} |
| US 7687161 | {Y02E60,T01M8,H01M8,H01M4,T01M4} |
| US 7704723 | {C12P7,Y02E50,C12R1} |
| US 7625728 | {C12P7,Y02E50} |
| US 7700332 | {} |
| US 7682812 | {C12P7,Y02E50} |
| US 7666637 | {C12P7,Y02E50} |
| US 7662617 | {C12P7,Y02E50,C10L1} |

Table 412. Semiotic vector for classification k='ECLA'.

|            | US 7629170 | US 7687161 | US 7704723 | US 7625728 | US 7700332 | US 7682812 | US 7666637 | US 7662617 |
|------------|------------|------------|------------|------------|------------|------------|------------|------------|
| US 7629170 | 1 | | | | 1 | | | |
| US 7687161 | | 1 | | | | | | |
| US 7704723 | | | 1 | 0.7 | | 0.7 | 0.7 | 0.5 |
| US 7625728 | | | 0.7 | 1 | | 1 | 1 | 0.7 |
| US 7700332 | 1 | | | | 1 | | | |
| US 7682812 | | | 0.7 | 1 | | 1 | | 0.7 |
| US 7666637 | | | 0.7 | 1 | | | 1 | 0.7 |
| US 7662617 | | | 0.5 | 0.7 | | 0.7 | 0.7 | 1 |

Table 413. Jaccard sparse similarity matrix for classification of type k.

|            | nm.2208 | nm.9596 | nm.4545 | nm.9597 | nm.17488 | nm.11614 | nm.2209 | nm.11043 |
|------------|---------|---------|---------|---------|----------|----------|---------|----------|
| US 7629170 | 0 | 0 | 0 | 0 | 0 | 0 | 1 | 1 |
| US 7687161 | 0 | 0 | 0 | 0 | 0 | 0 | 0 | 0 |
| US 7704723 | 0 | 2 | 0 | 1 | 0 | 0 | 0 | 0 |
| US 7625728 | 0 | 0 | 2 | 0 | 0 | 0 | 0 | 0 |
| US 7700332 | 0 | 0 | 0 | 0 | 0 | 0 | 0 | 0 |
| US 7682812 | 0 | 0 | 0 | 0 | 0 | 12 | 0 | 0 |
| US 7666637 | 0 | 0 | 1 | 0 | 0 | 0 | 0 | 0 |
| US 7662617 | 0 | 0 | 0 | 0 | 0 | 0 | 0 | 0 |

Table 421. Semiotic term frequency matrix.

| documentId | Semiotic Set |
|------------|--------------|
| US 7629170 | {nm.2209,nm.11043} |
| US 7687161 | {} |
| US 7704723 | {nm.9597,nm.9596} |
| US 7625728 | {nm.4545} |
| US 7700332 | {} |
| US 7682812 | {nm.11614} |
| US 7666637 | {nm.4545} |
| US 7662617 | {} |

Table 422. Semiotic vector for terminology t='bacterial nomenclature'.

|            | US 7629170 | US 7687161 | US 7704723 | US 7625728 | US 7700332 | US 7682812 | US 7666637 | US 7662617 |
|------------|------------|------------|------------|------------|------------|------------|------------|------------|
| US 7629170 | 1 | | | | | | | |
| US 7687161 | | 1 | | | | 1 | | 1 |
| US 7704723 | | | 1 | | | | | |
| US 7625728 | | | | 1 | | | 1 | |
| US 7700332 | | | | | 1 | | | |
| US 7682812 | | 1 | | | | 1 | | 1 |
| US 7666637 | | | | 1 | | | 1 | |
| US 7662617 | | 1 | | | | 1 | | 1 |

Table 423. Jaccard sparse similarity matrix for semiotic terms of type t.

|            | US 7629170 | US 7687161 | US 7704723 | US 7625728 | US 7700332 | US 7682812 | US 7666637 | US 7662617 |
|------------|------------|------------|------------|------------|------------|------------|------------|------------|
| US 7629170 | 1 | | | | | | | |
| US 7687161 | | 1 | | | | 1 | | 1 |
| US 7704723 | | | 1 | | | | | |
| US 7625728 | | | | 1 | | | 1 | |
| US 7700332 | | | | | 1 | | | |
| US 7682812 | | 1 | | | | 1 | | 0.7 |
| US 7666637 | | | | 1 | | | 1 | |
| US 7662617 | | 1 | | | | 0.7 | | 1 |

Table 430. Similarity matrix cross product.

Figure 4.

SEMIOTIC INDEXING OF DIGITAL RESOURCES

CROSS-REFERENCE TO RELATED APPLICATIONS

This application claims the benefit of U.S. Provisional Application No. 61/489,362 filed May 24, 2011, which is incorporated herein by reference in its entirety.

FEDERALLY SPONSORED RESEARCH

This invention was made with government support under STIR contract numbers DE-FG02-07ER86321 and DE-FG02-04ER63933 awarded by the Department of Energy. The government has certain rights in the invention.

BACKGROUND

This application relates to information retrieval, specifically retrieval of textual information that is stored in digital form using one or more externally managed terminologies or nomenclatures.

Knowledge workers in all fields rely on bodies of literature to support decision-making. Historically, these bodies of literature existed in printed form and were housed in libraries or other public or private collections and were comprised of a variety of books, book series, encyclopedic references, periodical publications (e.g., topical journals, magazines, trade journals, newspapers), or documents. Library collections were typically focused on either general or topical collections of works that were typically shelved using specific organizational methods (e.g., Dewey Decimal System) that became "industry standards" over time. In addition to providing information about the physical location of a work, ancillary information (metadata) about the nature of the work (e.g., author(s), publisher, year, synopsis of work, keywords) was typically maintained by specialists, cross-indexed and arranged into taxonomies so that librarians and readers could locate specific information more readily. Typically, this information was created, maintained and searched manually. Similar approaches were developed for the efficient storage and cataloging of large document collections (e.g., patent literature) where the parties responsible for maintaining such information devised methods for storage and retrieval of documents based on the similarity in subject material. Sophisticated coding systems evolved over time that provided users of these materials with the necessary information about where to locate specific collections of related topical information. Once the appropriate reference work or document collection was located, it was largely up to the knowledge worker to sift through subsets of the references or documents to determine which, if any, were relevant to address their needs.

Contemporary computerized systems for indexing, searching and retrieving information are an area of continuing innovation, and are challenged primarily by the volume of material that is now available in digital form. Despite all of the developments in the field, knowledge-workers are still confronted with the challenge of locating the correct information to meet their needs. This problem is simply that the volume of material that must be searched and reviewed continues to grow at a superlinear rate, as new information becomes available online and older material is digitized. This imposes increasing demands on contemporary knowledge workers because their depth of knowledge must be correspondingly greater; spanning not only contemporary developments in their field of expertise, but also historically relevant developments. In many areas this task is confounded by domain-specific terminologies, nomenclatures, taxonomies or ontologies that have strong temporal components as well as significant overlap, resulting in incidences of synonymy (multiple terms or names for the same object/concept), polysemy (multiple objects/concepts with the same term or name) or both.

New challenges also exist, because much of the information that is available (which is referred to interchangeably within this application as "content") is now available mainly or solely in digital form and is no longer retrieved from a physical location. Rather, it is retrieved from one or more computer servers that are located on private or public networks. Queries of such systems must not only map to the correct item of digital content, but also to the correct server where that content is stored and the knowledge worker has access privileges.

Indexing and abstracting schemes for digital content have also undergone many changes in recent years. Advancement in this area has been tremendously stimulated by research into "search" on the Internet. In addition to the use of keywords and other indexing schemes (e.g., US and ECLA patent classification schemes), considerable progress has been made in the area of natural language processing; which essentially entails programming a general purpose computer system to "read" a document, and to syntactically and semantically group that document or article with others that share some degree of similarity with the document or article in question. Ideally, one would like to have a computer understand human language, but that goal remains out of reach, thus far. Among other challenges, natural language is inherently ambiguous.

Various approaches have been developed to address this problem. Those approaches that have shown the most promise to date fall into the broad category of vector space models (VSMs). Unlike approaches that rely on a lexicon or thesaurus to extract meaning from a document on a word-by-word or phrase-by-phrase basis, VSMs automatically extract meaning from documents by measuring the similarity in word usage between documents or among all documents in a collection (a "corpus"). VSM models are based on the distributional hypothesis, which posits that words occurring in similar contexts tend to have the same meaning. In general, VSMs provide a vector of word frequencies, which can then be used for comparative purposes in deducing similar meaning via classification, clustering, ordination, or projection methods. Alternatively, the vectors can be used as selective data filters. Event frequency and pattern matching approaches are in widespread use in the social sciences and natural sciences and have proven very useful in grouping together similar individuals or objects based on predefined characteristics.

VSM and non-VSM methods of text analysis generally follow a similar route, beginning with one or more preprocessing steps. The input document or corpus is generally a plain text representation of a document in digital form, with special formatting features removed. The input file(s) are parsed and tokenized to identify each word or word-like string based on a predetermined set of grammatical rules or regular expressions that define word boundaries (e.g., whitespace, punctuation). Additional preprocessing steps (normalization and annotation) often follow including identification of parts of speech, lemmatization, word-use patterns or other special features of interest. The input file may be physically modified by the insertion of "tags" or other forms of annotation that mark features of interest. Alternatively, information about the occurrence and location of each word of interest may be stored independently. In some instances, typographical formatting features may convey additional meaning (e.g., inflected characters, altered type face, superscripting or subscripting).

Pre-processed files are then re-parsed to extract individual tokens from each document or corpus for analysis. In VSM, the occurrence and frequency of occurrence are extracted in the form of a list (a vector). The vector may be further associated with other information regarding the location of each token within the document or corpus (e.g., the file name and byte offset), the frequency of occurrence, adjacent words, concordance of words, etc. Vectors that share common terms may be combined into matrices of high-ordered tensors for further analysis.

VSMs as applied to semantic analysis fall into three broad approaches: term-document model, typified by the Apache Lucene search engine; word-context models, typified by the Latent Semantic Vectors package in Lucene and Pair-Pattern analyses used in latent relationship analysis as typified by the S-Space package, also running in the Lucene environment.

In the Term-Document model, words are treated as dependent variables that occur in documents. Vectors are produced by tallying the frequency of occurrence of each word. Word order, however, is not determined (or, at least not used in subsequent analyses). Term-Document models perform well in capturing information about a document, especially when "stop words" (frequently occurring, non-informative words such as definite and indefinite articles) are left out. The model is closely aligned with the "bag of words" hypothesis and the distributional hypothesis and performs well because the choice of words used by an author is probabilistically influenced by the topic on which they are writing.

In the word-context model, the semantic similarity of words is established by examining their co-occurrence in a document or corpus. While typically used to establish the contextual meaning of words, co-occurrence vectors can also be mapped to individual documents within a corpus to identify similarity in contextual usage of a term and can be used for identifying subsets of documents within a corpus that share similarity of meaning.

Pair-pattern analysis (also known as latent relationship analysis) examines the frequency of co-occurrence of word-pairs in documents or corpora. This approach is typically coupled with a thesaurus to expand the definition of word-pairs and to offset the difficulties and computational burden associated with dealing with sparse matrices in the analyses that typically follow.

Once semantic vectors have been extracted from documents or corpora, a variety of well-known mathematical approaches can be applied to the resulting vectors and tensors to establish similarity, dissimilarity or semantic proximity between or among the documents of interest. The process typically begins with application of an algorithm that transforms the term-frequency vectors or matrices into a distance, similarity or dissimilarity matrix. A wide variety of algorithms are available and well known in the art to derive such values including, but not limited to geometric measures of distance (Euclidean distance, Manhattan distance, cosign similarity) and measures commonly used in information theory (Hellinger, Bhattacharya, Kulbeck-Lubler). Selection of the optimal measure is often determined empirically and tied, at least in part, to the desired method of conveying this information to end-users or readers. Various smoothing and weighting functions may be applied at this step to minimize the effect of outliers and to maximize the amount of information that is actually available within the data set.

The final step in the process is the interpretation of the mathematical analysis results. A variety of approaches that are commonly used in exploratory data analysis and machine learning are available and applicable. Ideally, the method used should minimize information loss. Typically, results of such analyses are summarized in both graphical and tabular form. Documents that are most similar to one another typically plot closest to each other and appear closest to each other in sorted lists. The end-user/reader must then determine which results make the most sense, using the output of the analysis to support their decision.

VSM for semantic searching of large corpora has become an important approach to information retrieval. It is especially useful within a collection of highly structured documents, especially within technical areas including scientific, technical, medical and legal literature. VSM methods also underpin some of the commercial and publically available search systems used in analysis of the patent literature.

VSM based indexing and information retrieval provide a number of distinct advantages over simple query methods based on single terms or lists of terms that are composed using Boolean methods. Deerwester (U.S. Pat. No. 5,788,362) teaches that data and documents can be indexed, filtered and retrieved, using vector and matrix operations and has provided much of the foundational work on which current VSM models are based.

In Liddy et al. (U.S. Pat. No. 5,873,056), VSM are applied in a system that uses natural language processing to generate a subject vector that is representative of the source text. The subject vector was composed of source codes, which were in turn derived from a lexical database that was used to categorize each word in the source text. This embodiment provided access to meanings and word senses in a method designed to disambiguate each word to arrive at an accurate meaning. The subject codes were used to produce weighted, fixed-length vector representations of the semantic content of documents within a corpus.

The major problem encountered with this approach was instances of polysemy, where the system could not automatically assign the appropriate subject code to a given case. The method and system is further limited by the highly restrictive number of subject codes available (124), although finer-grained codes were available as part of a hierarchical coding scheme to improve classification. Such a low level of dimensionality is unlikely to provide meaningful filters of large and disparate corpora. In addition, subject codes appeared to perform only marginally better than keyword indexing.

In Liddy et al. (U.S. Pat. No. 5,963,940) a method and system for indexing documents based on natural language processing, up to 680 subject field codes were used in a VSM. The field codes were arranged hierarchically into categories and subcategories. The system also tagged each word and indexed each at the syntactic, lexical, morphological, semantic, discourse, and pragmatic level. Each term was assigned values for seven fields, and subject code data was stored in a separate database that was used to index the processed documents. The system also provided a special treatment of proper nouns and noun groups and included an expansion to include subordinate members and resolution of synonyms, meronyms and hyponyms (i.e., words or phrases that are included within the meaning of another word or phrase; e.g., "is-a" relationships). Similarity matching was not based on a semantic vector; rather it was based on a vector of combined scores arising from a complex analysis of multiple linguistic features. Extensive training sets were required, especially in the cases where proper nouns and restricted knowledge domains were involved.

In U.S. Pat. No. 6,185,550 Snow et al. describe a method and an apparatus for classifying documents within a class hierarchy using a VSM. In this embodiment, documents are classified using specific term vectors that are part of a separately maintained hierarchy that was developed to dictate directory naming and file storage locations on a computer system.

In U.S. Pat. No. 7,133,860 Iizuka et al. describe a device and a method for automatically classifying documents using vector analysis. A relational matrix is described in which distances between words and distances between documents is estimated in a manner analogous to R- and Q-analyses used in numerical taxonomy. In an R-analysis, the estimate of similarity, dissimilarity, correlation or geometric distance is based on correlations among the attributes (dependent variables) that appear within the objects that are included in the classification. An R-analysis is useful in determining the natural weighting that occurs in a dataset. In a Q-analysis, the estimate is of similarity, dissimilarity, correlation or geometric distance among the objects, based on the attributes that are used in the classification. When applied to document analysis, an R-analysis would be useful in determining which words would have the greatest impact on the classification (including those words that occur frequently but have little information content). This is described using an alternative approach in the '860 patent, applying an algorithm that measures "force" of different keywords that were part of a method for determining relationships among clients and commodity products.

In U.S. Pat. No. 7,299,247 Colisti-Yeh et al. described an apparatus and method for producing a semantic representation of information in a semantic space. The advantage of the method described therein was that information in documents were represented at a semantic level that could be adjusted to meet the user's needs, that documents could be clustered, searched and classified based on semantics and that the system and method was trainable. The method does, however, require considerable user-interaction and intervention.

Outside the narrow but active field of VSM application in semantics, other relevant developments have taken place that have bearing on this application.

In U.S. Pat. No. 6,834,290 Ausputz describes a semiotic model for querying a computer. Limitations of semantic and syntactic querying systems are laid out as problems that can only be addressed by a system and method that fully satisfies the Peircean reduction theorem. The system employs a semiotic describer that provides additional information about query terms that include semiotic signifiers. The describers provide information about query terms that include semiotic signifiers. The describers provide information about parts of a query, in the form of a piece of media (digital content) that is associated with one or more signifiers. The system is distinct from other prior art as the '290 patent makes no reference to VSM and none appear to be used. The '290 patent is also silent about the extent of training that is required to achieve acceptable results.

In U.S. Pat. No. 7,925,444, Garrity et al. (which is incorporated herein by reference in its entirety) describe a system and method for resolving ambiguity between names and entities. This invention discloses a method for resolving synonymies and homonymies that exist in biological nomenclature using a semiotic model that satisfies the Peircean reduction theorem through the use of redirection, mediated through actionable, globally unique, persistent identifiers (PIDs). Biological nomenclature (specifically those names applying to Bacteria and Archaea) represents one of a number naming systems and terminologies that have specific application in a particular field of science, technology, medicine or law. Each such system is typically "managed" in that it follows a specific set of rules for creation, maintenance, change and application of those names/terms and the concepts and entities to which they apply. The invention fully supports accessing any form of digital information via names, taxonomic concepts or exemplars (a metadata representation of a physical entity). The invention also supports accurate resolution of names or terms and linking together all elements into one or more taxonomies based on published information. The use of actionable PIDs of any type or class provides a mechanism whereby instances of biological names could be linked directly to semantic/semiotic information about the name and its application.

In US 2010/0198841 Parker et al. (which is incorporated herein by reference in its entirety) build on the '444 patent. They describe systems and methods for automatically identifying and tagging biological names and name-like strings in digital resources and providing semantic resolution services via PIDs. They also describe a method for extending the list of names and name-like strings and automatically tracking the frequency of occurrence and location of each name in digital resources.

In U.S. Pat. No. 8,036,997 Garrity et al. describe a method of uncovering and correcting annotation errors using a self-organizing, self-correcting algorithm. In that application, they also demonstrate how the output of large-scale classifications could be visualized using re-ordered heatmaps.

SUMMARY

Although each of the aforementioned patents and applications provide useful solutions to problems that each was intended to solve, none teach how one can solve the more challenging problem of efficiently indexing and classifying large amounts of domain-specific documents or other digital content (including, e.g., scientific or patent literature) to allow for rapid and precise retrieval of subsets of documents that fulfill specific criteria, especially in instances where high levels of terminological or nomenclatural ambiguity may exist.

While highly successful, current methods of full-text information retrieval using VSM suffer from a common problem, namely, each must be trained, at times extensively, prior to application. This is because the vectors, matrices, and higher order tensors of words or terms that are used must be derived from the corpus, then narrowed to a subset that occurs with sufficient frequency to provide a meaningful subdivision of the corpus. If the corpus is large and heterogeneous in nature, the resolution of the resulting classification will be poor, as technical terms will occur at a much lower frequency than many common words. While cleansing of word-lists can be used as part of a strategy to improve performance, such a task can be labor intensive. Alternatively, specialized subsets of content can be used to improve accuracy, but once again, this requires a number of decisions to be made a priori that will likely impose an unknown level of bias. Also, as the scope of material grows within a corpus, the likelihood of encountering unresolved synonymies, meronymies, hyponymies and polysemies increases, but the extent to which these increases occur is generally unknown, prospectively.

Among other things, what has not been heretofore appreciated has been the value of using an actively-maintained, semantically-disambiguated and well-regulated system of nomenclature (defined herein as an externally managed nomenclature or terminology) as part of an information retrieval method and system. As disclosed herein, the use of an externally-managed nomenclature or terminology largely overcomes the limitations of existing methods and can be applied to solve real problems in indexing and classifying large corpora of technical information, providing a means of retrieving subsets of documents based on using a "tunable" classifier and resolving all known instances of semantic ambiguity within a specific field of science.

Thus, in various embodiments, the invention includes a method of classifying patent applications and grants using an externally managed set of terms, names, or persistent identifiers that are combined into a vector that acts as a signature or "fingerprint" for each document. In one embodiment, the vector includes the validly published names of Bacteria and Archaea, while in other embodiments the vector may include other lists of terms that are relevant to a particular field of study and are widely used to describe objects or concepts of interest. Suitably, the terminology, nomenclature, or ontology is maintained independently (i.e., not derived from the corpus) and is in wide use by subject experts.

In other embodiments, the invention includes a method of classifying documents or resources such as patent applications or granted patents that use a vector including a first set of externally maintained terms, names, or persistent identifiers that may be combined with a second set of externally managed terms, concepts or classifiers (e.g., IPC, ECLA, Derwent patent classification codes, keywords, or ontologies).

In still other embodiments, the invention includes a method of grouping patent documents into a hierarchical arrangement based on computing vectors of pairwise similarity based on names, terms, or higher-order groups of names or terms that may be used either singly or in combination with other vectors of classifiers or related information used to group or index such documents.

In other embodiments, the invention includes a method of grouping previously unclassified patent documents by comparing a vector of names or terms against a fixed database of previously classified documents so as to compute similarity without having to resort to computationally intensive clustering approaches.

Application of the same approaches to the classification of non-patent technical documents (e.g., the scientific and technical literature, web documents, contents of databases).

In one embodiment, the invention provides a method of classifying a plurality of documents. The method includes steps of providing a first set of classification terms and a second set of classification terms, the second set of classification terms being different from the first set of classification terms; generating a first frequency array of a number of occurrences of each term from the first set of classification terms in each document; generating a second frequency array of a number of occurrences of each term from the second set of classification terms in each document; generating a first similarity matrix from the first frequency array; generating a second similarity matrix from the second frequency array; determining an entrywise combination of the first similarity matrix and the second similarity matrix; and clustering the plurality of documents based on the result of the entrywise combination.

In another embodiment, the invention provides a computer-based system for classifying a plurality of documents. The system includes a processor and a storage medium operably coupled to the processor. The storage medium includes program instructions executable by the processor for providing a first set of classification terms and a second set of classification terms, the second set of classification terms being different from the first set of classification terms; generating a first frequency array of a number of occurrences of each term from the first set of classification terms in each document; generating a second frequency array of a number of occurrences of each term from the second set of classification terms in each document; generating a first similarity matrix from the first frequency array; generating a second similarity matrix from the second frequency array; determining an entrywise combination of the first similarity matrix and the second similarity matrix; and clustering the plurality of documents based on the result of the entrywise combination.

Other aspects of the invention will become apparent by consideration of the detailed description and accompanying drawings.

BRIEF DESCRIPTION OF THE DRAWINGS

FIG. 4 shows detailed examples of matrices and data tables that are used in computing first-order and higher-order similarity matrices used in semiotic fingerprinting.

DETAILED DESCRIPTION

Figure 1:
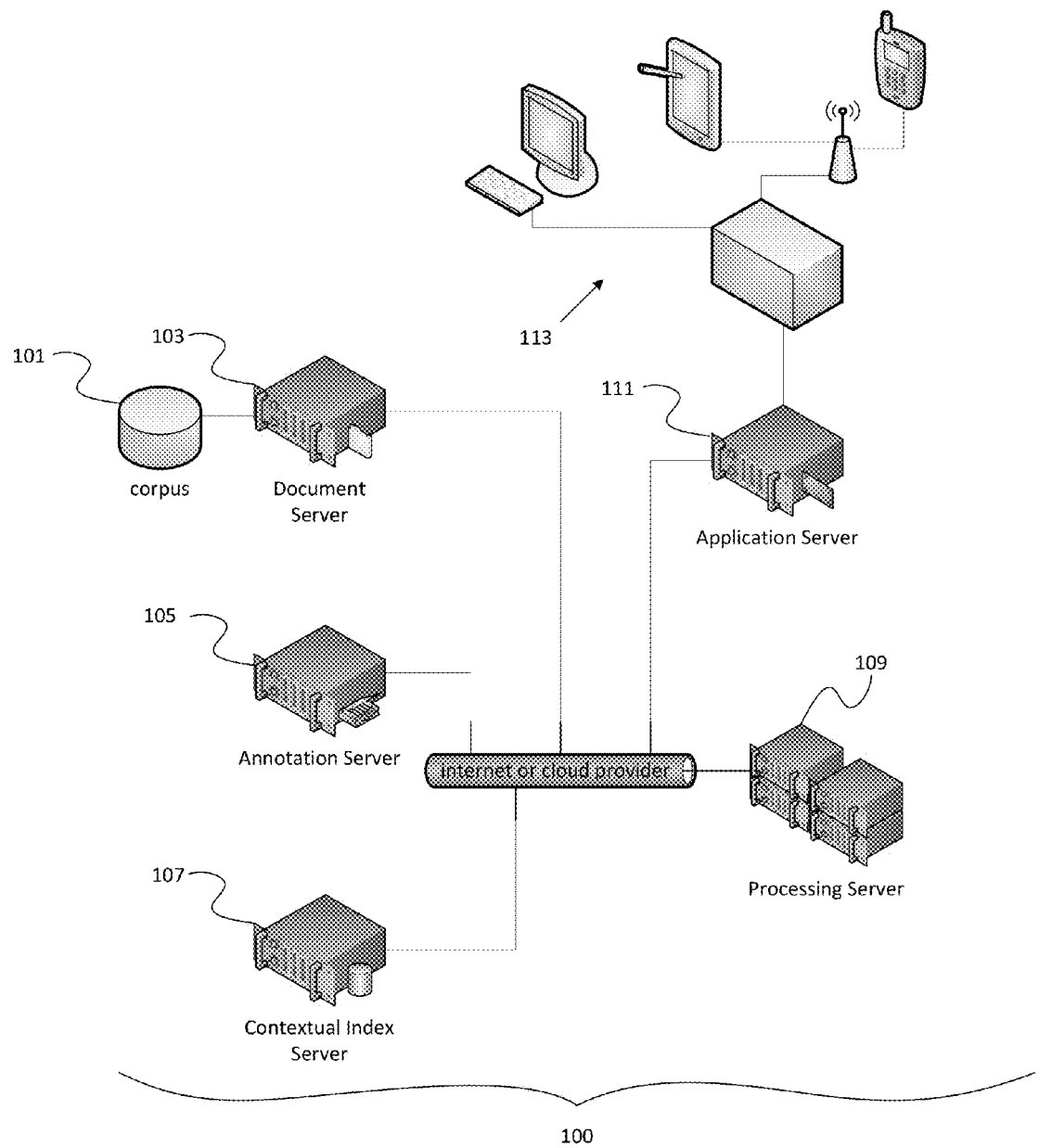
FIG. 1 shows a network diagram with the logical separation of services depicted as individual computer servers on a network.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A persistent identifier (PID) includes globally unique, long lasting identifiers (names) that are used to reference an object in a digital environment. PIDs are part of a controlled system that requires registration of identifier/object/location and provides a resolution mechanism so that the identifier can be used to retrieve the associated object or a metadata representation of that object in a network environment. Examples of PIDs include Digital Object Identifiers (DOIs), Archival Resource Keys (ARKs), Life-Science Identifiers (LSIDs), Persistent Uniform Resource Locators (PURLs), Uniform Resource Names (URNs) and Extensible Resource Identifiers (XRIs).

A document includes various forms of textual information that is intended to record and convey information in written form. A document may occur in printed form, in digital form or both. A document may be typeset, published, and intended for broad distribution or may be a single item intended for limited distribution or archival purposes. A document may be highly structured and have associated metadata intended to aid in search and retrieval or it may be unstructured.

Cluster analysis includes numerical methods of defining groups (clusters) in a data set. Various cluster analysis methods are known to those skilled in the art and are used in a number of fields including exploratory data analysis and machine learning, natural and social sciences, medicine, and commerce. Cluster analyses are generally based on the assumption that objects or entities that resemble each other (i.e., have similarity) based on one or more shared properties will tend to cluster together, while objects that do not resemble each other will not cluster together. Cluster analyses fall into two broad categories: partitioning methods and hierarchical methods.

Partitioning methods include methods that divide a dataset into a predetermined set of K clusters, for a given integer (K). K is usually determined empirically, over a range of values in which some estimation of quality of the clusters formed is maximized and used to guide the selection of K.

Hierarchical methods include those that either combine individual entities into successively larger groups (agglomerative methods) or divide groups of entities until each entity is represented individually (divisive methods). Both approaches result in hierarchical arrangements that follow the path in which groups are merged or split and are often presented in the form of tree graphs or dendrograms.

Prior to cluster analysis, observational data is often transformed into a similarity, dissimilarity, distance, or correlation matrix in which the degree of similarity between all pairs of objects is expressed numerically. The resulting matrix may then be used as the input to various visualization techniques that can be used to graphically depict the implied relationships. As used herein, the term similarity matrix may be used in a generic sense and may be apply equally to a similarity, dissimilarity, distance or correlation matrix.

A similarity matrix is a square matrix (identical number of rows and columns) of non-negative entries, bounded by 0.0 (no similarity) and 1.0 (identity) that is symmetric (element i,j=element j,i) with the additional property that each entry on the main diagonal must be equal to 1.0. A dissimilarity matrix shares properties with a similarity matrix, but expresses the relationship between entities as the opposite. In the case of a similarity matrix, dissimilarity is defined as 1.0—similarity.

A distance matrix includes symmetric matrices (where entries on the main diagonal equal 0.0) which provide a numerical measure of how far apart two or more objects are in real or Cartesian space. A number of algorithms are known to those skilled in the art for computing distance, including Euclidean distance, absolute or Manhattan distance, and binary distance. Distance measures are generalizable to higher dimensional spaces.

The Jaccard coefficient may be used in creating similarity matrices, as in the exemplary embodiments disclosed herein; nevertheless, in various embodiments of the invention other coefficients and methodologies known to those skilled in the art could (additionally or alternatively) be used to determine similarity, dissimilarity, correlation, or geometric distance.

Entrywise combination includes any of a group of operations on vectors or matrices such that $A_{i,j}$ o $B_{i,j}$=$AB_{i,j}$ where A, B and AB are matrices, i,j is the element in a matrix at position (i,j), and o is any continuous function or map, including without limitation any linear function.

A heatmap includes grayscale, color gradient or color-mapped matrices in which the magnitude of the underlying data is reflected in the shading or color scheme. Unlike other graphical techniques that are used to visualize high-dimensional data, heatmaps scale well and introduce no distortion into the underlying data. When the data matrix is sorted and smoothed as described by Garrity and Lilburn (U.S. Pat. No. 8,036,997 B2) along the X- and Y-axes, a heatmap can reveal the clustering and hierarchical relationships. Heatmaps can also be used as part of a graphical user interface to directly access pairwise similarity, distance or related data.

Patent classification codes include any of the language-independent, hierarchical patent classification codes applied by one or more of the intellectual property offices that are used to classify, index, and retrieve patent documents.

A term includes a word or a group of words that has a specific meaning in a given context. The meaning of a particular term may differ from the usual meaning of the same word or words in a different context or as it may be used in normal discourse. Terms and terminologies often apply to a specific subject field or topic and are used by knowledge workers in normal discourse.

Nomenclature includes various specialized forms of terminology (including computable terminologies) dealing with the formation and application of names to objects or concepts of interest. In many fields of study, formalized systems of nomenclature are used to help standardize the naming of objects and concepts. In the life sciences, there are six major codes of nomenclature that apply to plants (including fungi and algae); Bacteria and Archaea; animals (including protozoa); viruses; cultivated plant varieties; and phytopathogenic bacteria. Other formal systems of nomenclature in the life sciences include enzyme nomenclature, gene nomenclature, protein nomenclature, medical devices, and human anatomy, to name a few. In the physical sciences, systems of nomenclature exist for naming astronomical objects, chemicals, minerals, materials, and units of measurement, to name a few. Outside the natural sciences there are many other systems of nomenclature. These include but are not limited to such systems as harmonized commodity codes, billing codes used in insurance systems, cartographic naming systems, trademarks, trade names, manufacturing parts, and various specifications.

Disambiguation refers to a process by which a single grammatical or semantic interpretation is established for a particular term, for example as described for Bacteria and Archaea in the Garrity et al. '444 Patent, although these methods can be applied to other terminologies as well.

The system and method of semantic resolution of the Garrity et al. '444 Patent (also referred to herein as the N4L, or NamesforLife, model or system) parallels the classic semiotic triangle of Ogden and Richards, however it differs in that it adds PIDs to each component (the symbol or N4L::name object; the thought or N4L::taxon object; the referent or N4L::exemplar object). The PIDs are actionable and provide direct access to metadata that describes the relationships among names, taxa (plural for taxon), and exemplars and the necessary information to disambiguate each component or the relationship among the components. Unlike the semiotic triangle, the N4L model also solves problems associated with hypernyms and hyponyms. The use of PIDs and redirection also provides a means of correctly resolving the various forms synonymy that are known to occur in systematic biology (e.g., new combinations, homotypic and heterotypic synonyms, homonyms, orthographic variants). This is accomplished by mapping all of the appropriate one-to-one, one-to-many, many-to-one and many-to-many relationships through the PIDs.

An externally managed nomenclature or terminology includes those that are generally used or applied in a scientific, technical, medical, or other field by its practitioners (e.g., biological or chemical nomenclature, subject language terminologies). The nomenclature or terminology may be subject to specific rules that govern formation and application of names or terms. As used herein, the externally managed nomenclature or terminology includes but is not limited to those that have been modeled using the N4L system and method of semantic resolution.

Semiotic vectors include lists of PIDs that reference names or terms from a managed nomenclature or terminology that occur in a digital resource and are comprised of a linear representation of the relationships that exist among a group of synonyms, hypernyms, and hyponyms.

Although the exemplary embodiments disclosed herein are focused on patent documents and patent databases, a corpus for the purposes of the present invention may, in various embodiments, include any group of documents in the scientific, technical, medical, legal or other literature, including documents that are held by various private and public entities. Further, the corpus may include documents that are available in public and private repositories, databases that are used in research such as those maintained by the International Nucleotide Sequence Database Consortium; in commerce such as the USPTO, and other entities.

A drawback when working with the patent literature is that descriptions of both the field of a technology and the claims of an invention are frequently written in complex language that may not be immediately clear, even to expert indexers, researchers, patent examiners or attorneys. Some have argued that complex writing is intended to obfuscate claims and confound classification. This means that retrieving subsets of patent documents and supporting literature is likely to be incomplete for a given technology, especially if simple searches are used (e.g., keywords, single terms, with or without stemming).

At present, the intellectual property intelligence (IPI) community relies on multiple indices that are provided by different patent authorities (e.g., the IP5, i.e. European Patent Office, Japan Patent Office, Korean Intellectual Property Office, State Intellectual Property Office of the People's Republic of China, and United States Patent and Trademark Office) and commercial indexers (e.g., Derwent, IFI, Thompson, STN, SumoBrain Solutions, IP.com). Some are broad in scope and apply to multiple jurisdictions, whereas others are special purpose (e.g., IDT is still used for organic chemistry and biochemistry classification in the ECLA scheme). There are also competing coding systems in use by the indexers that overlap significantly, specifically the IPC and ECLA schemes.

There is a general consensus that there is room for improvement, especially in covering newly emerging fields, such as green technologies, leading to several public experiments. The European Classification (ECLA), maintained by the European Patent Office (EPO) has introduced a new high-level class to its list of >140,000 codes; WIPO (World Intellectual Property Office) has created a Green Inventory based on the International Patent Classification (IPC, >80,000 codes). Commercial indexers IFI/Fairview Research and Derwent have also introduced secondary indexes for green technology. However, adding more classification codes to patents does little to make them more readily findable, especially when the codes and terms are not used by either the author-inventors or non-specialist readers as a part of their normal language (a similar problem exists with the term sets used to index the scientific, technical and medical (STM) literature).

There are, however, term sets that are maintained independently of the patent literature, which appear unaltered in patent documents. The appearance of these terms in patents provides an indication of the nature of an invention, especially when viewed in combination with other information that can be contextualized based on its appearance in different parts of the document. Bacterial nomenclature is one such example. Even though patent classification currently uses an outdated source of bacterial nomenclature (Bergey's Manual of Systematic Bacteriology, $8^{th}$ Edition, 1975), this need not present an obstacle to accurate search and retrieval for an end user of systems and methods described in Garrity et al. (U.S. Pat. No. 7,925,444) and Parker et al. (US 2010/0198841), which insulate end-users from the effects of using an outdated nomenclature or terminology and allow them to read older literature (e.g., scientific, technical, medical, patent) in the proper perspective. While intended as a system and method of semantic disambiguation, document annotation and information retrieval, we have discovered that this approach can serve as an improved VSM for filtering, indexing and retrieving digital content based on specific relationships that exist between the use of an externally managed technical terminology and associated document metadata that could uniquely identify documents of potential interest ("semiotic fingerprints").

Figure 2:
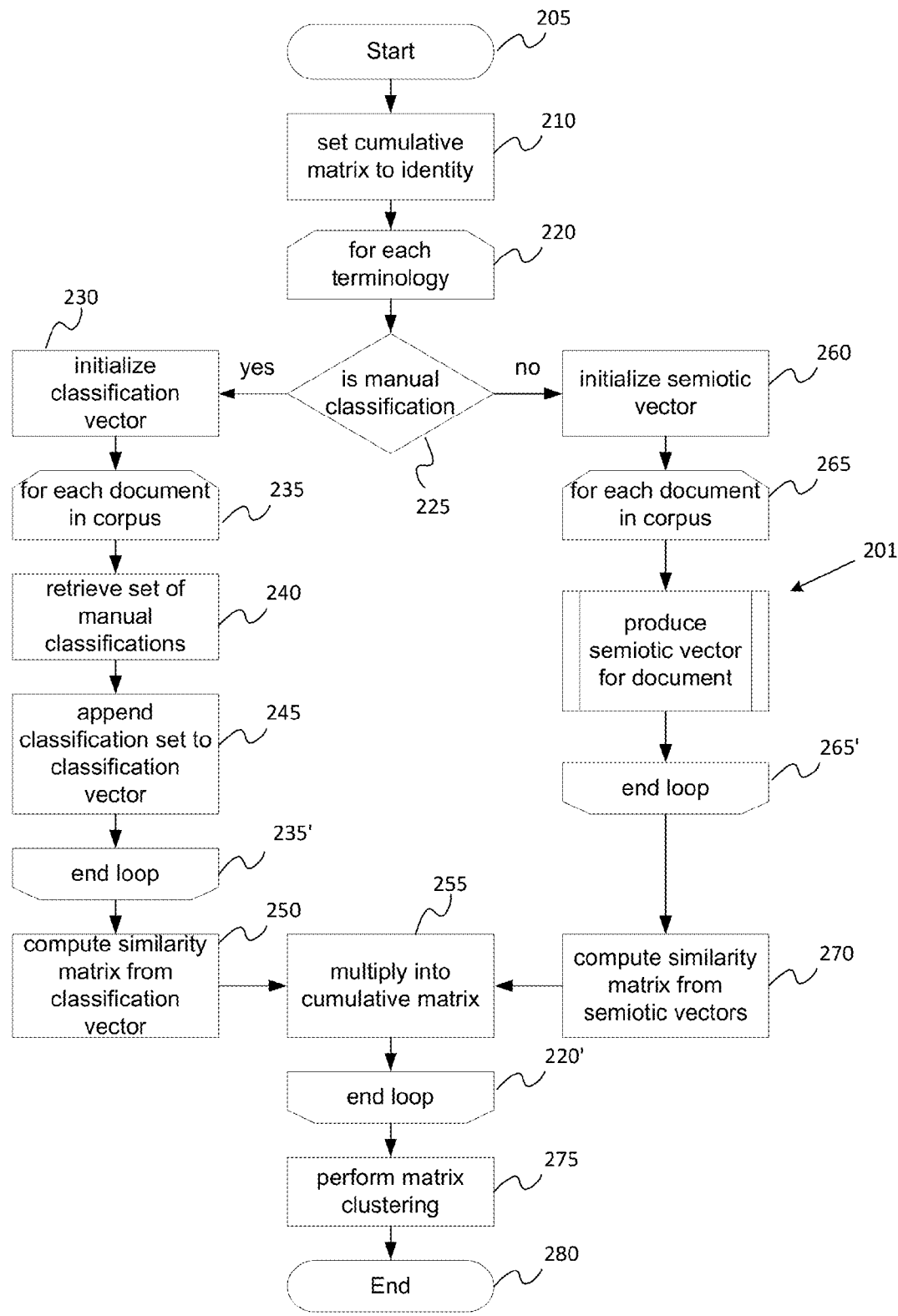
FIG. 2 shows a process whereby a second- or higher-order dissimilarity matrix is derived.

FIG. 1 shows a system 100 configured to provide semiotic fingerprinting services for indexing and retrieving selected documents from a corpus of digital content. The detailed steps in the process are shown in FIG. 2 and in FIG. 3, which describe embodiments of the invention. As indicated in FIG. 2, the steps include start 205, set cumulative matrix to identity 210, loop for each terminology 220-220', decide if manual classification 225, and if yes then initialize classification vector 230, loop for each document in corpus 235-235', retrieve set of manual classifications 240, append classification set to classification vector 245, and compute similarity matrix from classification vector 250. If not manual classification then initialize semiotic vector 260, loop for each document in corpus 265-265', produce semiotic vector for document 201, and compute similarity matrix from semiotic vectors 270. The semiotic vectors are then combined (e.g., multiplied) into a cumulative matrix 255, followed by perform matrix clustering 275 and end 280.

Figure 3:
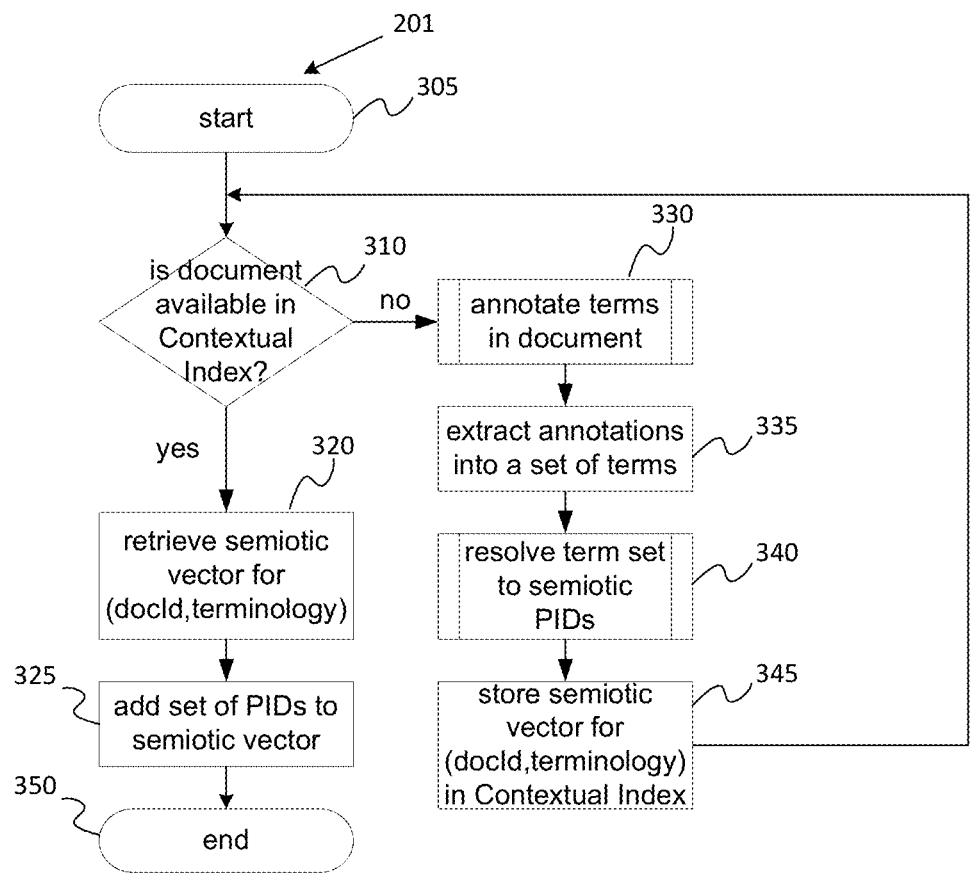
FIG. 3 shows a subprocess whereby a semiotic vector is produced and stored, or, alternatively, retrieved from a storage system.

Details of step 201 are shown in FIG. 3, including (at start 305) a determination of whether a document is available in the Contextual Index 310, and if yes then retrieve semiotic vector for (docID, terminology) 320, add a set of PIDs to semiotic vector 325, and end 350. If the document is determined not to be available in step 310, then the following steps are carried out: annotate terms in document 330 (see Garrity et al. '444 Patent), extract annotations into a set of terms 335, resolve term set to semiotic PIDs 340 (see Garrity et al. '444 Patent), store semiotic vector for (docID, terminology) in Contextual Index 345, and return to start 305.

In various embodiments, the system 100 includes one or more computer systems in communication with one another through various wired and wireless communication means which may include communications through the Internet (FIG. 1). Each computer system may include an input device, an output device, a storage medium, and a processor. Possible input devices include a keyboard, a computer mouse, a touch screen, and the like. Output devices include a cathode-ray tube (CRT) computer monitor, a liquid-crystal display (LCD) or LED computer monitor, and the like. Storage media include various types of memory such as a hard disk, RAM, flash memory, and other magnetic, optical, physical, or electronic memory devices. The processor may be any typical computer processor for performing calculations and directing other functions for performing input, output, calculation, and display of data in the disclosed calculator. Implementation of the system 100 includes generating a set of instructions and data that are stored on one or more of the storage media and operated on by a controller. The data associated with the system 100 can include image data and numerical data.

In one embodiment, the system 100 may include a web page for facilitating input, control, analysis, and other functions. In other embodiments, the system 100 may be implemented as a locally-controlled program on a local computer system which may or may not be accessible to other computer systems. In still other embodiments, the system 100 may include modules which provide access to portable devices such as laptops, tablet computers, and smart phones.

In another embodiment, a plurality of documents (sometimes referred to herein as a corpus) is classified using the methods of the present invention. First and second sets of classification terms (each of which may include, for example, patent classification codes as well as nomenclature(s) from one or more fields) are selected for use in classifying the plurality of documents. First and second frequency arrays are generated which show the number of occurrences of each item from the first and second sets of classification terms. For example, if the plurality of documents (i.e. corpus) is a group of patents and the first set of classification terms is the set of bacterial and archaeal names, the first frequency array would be a list of how many occurrences there are of each bacterial or archaeal name in each patent (with a '0' indicating patents in which none of the names appear or a number which shows the number of times the name appears in the patent, see FIG. 4, Table 421). Similarly, if the second set of classification terms is a set of patent classification codes, then the second frequency array would be the frequency of each patent classification code for each patent (essentially a '1' or a '0' to indicate if the patent has the particular code or not, see FIG. 4, Table 411).

The first and second frequency arrays can then be converted to a similarity matrix, for example using the Jaccard coefficient (see FIG. 4, Tables 423 and 413). These similarity matrices can in turn be combined in an entrywise manner using a continuous function, for example multiplication (see FIG. 4, Table 430). The plurality of documents can then be clustered based on the result of the entrywise combination. To facilitate visualization and analysis of the relationships between the various documents, the clustered results can be displayed in various ways including heatmaps (e.g., a matrix such as that shown in FIG. 4, Table 430 would be translated to a heatmap by depicting the values as colors or grayscales).

Clustering the documents can be performed using methods known to those skilled in the art, including a non-hierarchical method such as monothetic divisive clustering, minimization of trace clustering, multivariate mixture model clustering, Jardine and Sibsons's K-dend clustering, distribution-based model clustering, density based model clustering, partitioning based clustering, and Bayesian based clustering. Other methods of clustering the documents include hierarchical clustering methods such as single linkage clustering, complete linkage clustering, group-average clustering, and centroid clustering.

While the examples herein use the case of using two sets of classification terms to produce two frequency arrays and similarity matrices, the method can in fact be expanded to use three or more sets of classification terms to produce three or more frequency arrays and similarity matrices, with three or more similarity matrices being combined using matrix operations as discussed above.

In addition, while the operations described above are performed on matrices representing the entire corpus, in some embodiments the arrays can be reduced in size to improve computational efficiency, for example by eliminating any documents for which there are no instances of the first and/or second classification term. In some embodiments, documents with so-called 'singletons,' i.e. just a single instance of a particular classification term, can be eliminated to improve data quality. In still other embodiments, a different minimum level of instances for a classification term can be established for the purpose of improving data quality and/or improving computational efficiency. In those cases in which the arrays are reduced in size by removing one or more documents, the resulting matrices (first, second, etc.) are determined according to either an intersection of the first, second, etc. frequency arrays or a union of the first, second, etc. frequency arrays.

In one particular embodiment, a corpus (101) consisting of the EPO green technology collection of patents (ECLA Y02), which consisted of 365,746 grants and applications from 73 patent authorities at the close of 2010 was selected for analysis. In keeping with standard approaches to VSM and non-VSM text analysis, the corpus was preprocessed with a semantic markup utility (105) to annotate instances of bacterial and archaeal names in the text. The annotations were then extracted and stored in a vector (107) as the following n-tuple: (patent document identifier, bacterial name persistent identifier, count). The ECLA and IPC classifications were also extracted for each patent and stored in vector files (107) of the n-tuple: (patent document identifier, classification code). These IPC and ECLA vectors were post-processed (109) to resolve to the classification group level instead of the class level, i.e. (patent document identifier, classification group). End-users interact with the system (queries, visualization, results) through an application server (111) that is accessible via web services or mobile applications (113).

A total of 3,845 patent applications and grants were recovered from the corpus which contained 3,388 of 14,429 bacterial and archaeal names held in the NamesforLife database at the time of analysis. The NamesforLife database of Bacterial and Archaeal nomenclature is one example of an externally-managed, semantically disambiguated nomenclature or terminology, generated using the systems and methods described in the Garrity '444 patent. The number of names per patent (name vectors, FIG. 4, Table 422) ranged from 1-,290, with an average of 13 names and a median of 5 names per document. In addition to name occurrence, frequency data for each name occurrence per patent was tabulated (FIG. 4 Table 421). The resulting name vectors were then used to further examine the associations among the patents based on the IPC and ECLA classifications (FIG. 4 Table 412). The subset of patents containing bacterial and archaeal names fell into 1,078 different IPC groups (mean 2.6, median 2.0, range 1-28) and 631 ECLA groups (mean 4.1, median 4.0, range 1-28).

Each of the frequency matrices was converted to a simple binary matrix (FIG. 4, Table 421) in which the names or patent classifications were scored as present or absent. Similarity matrices were then produced using the Jaccard coefficient (FIG. 4, Table 413, and FIG. 4, Table 423) and then examined by various well-known methods to determine the possible relationships among the patents.

Simple associations (e.g., names vs. patent, names vs. classification, classifications vs. patent) could be directly derived from the captured data. More complex patterns involving multiple many-to-many relationships (e.g., names vs. classification category) could be estimated from cross-products of underlying contingency and frequency data, but did not directly map back to the patent documents. Application of hybrid hierarchical classification schemes, in which clusters of patents were identified and combined, based on similarity of names and patent classifications could yield such information, but required considerable manual intervention.

Other commonly known methods of exploratory data analysis were used in an attempt to group together similar patents and render meaningful visualizations. These methods included principal components analysis (PCA), hexagonal binning and agglomerative clustering. PCA was found to be limited in utility because the dimensionality of the original data could not be reduced sufficiently to yield meaningful results. Hexagonal binning of cross-products of similarity matrices (patent/name×patent classification) resulted in outcomes in which a single patent could appear in multiple locations, which was less than satisfactory.

Figure 5:
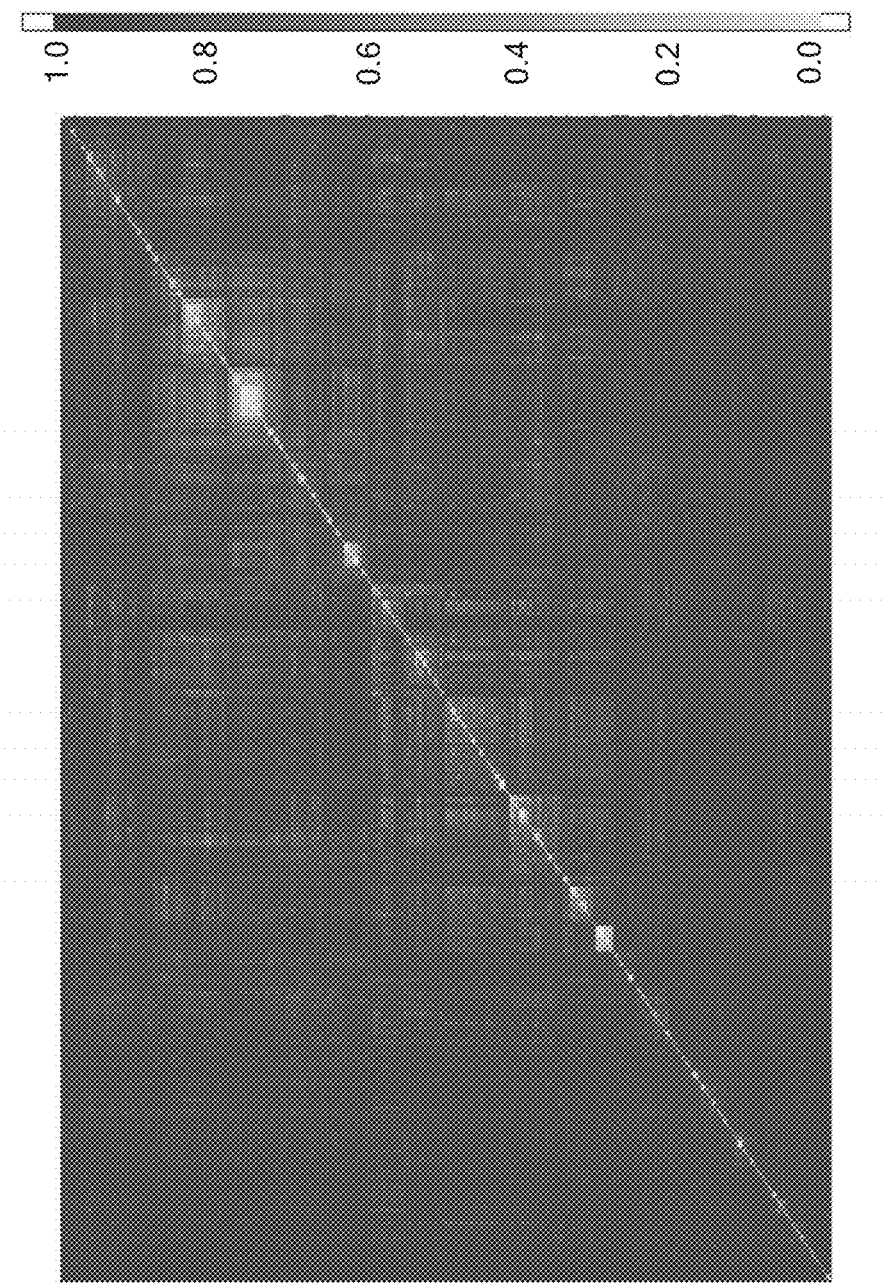
FIG. 5 shows a heatmap visualization of a binary classification of 3,845 patents classified based on the presence or absence of 3,388 names of Bacteria or Archaea, prior to the removal of singletons.

FIG. 5 shows a heatmap visualization of a binary classification of 3,845 patents classified based on the presence or absence of 3,388 names of Bacteria or Archaea, prior to the removal of singletons. Similarity was estimated by the Jaccard coefficient and the matrix was reordered by single-linkage clustering along both axes prior to visualization. The matrix is symmetric with nearest neighbors appearing close to the diagonal. Shading is based on similarity, as shown in the key to the right side. Clusters of similar patents appear as light colored blocks.

Figure 6:
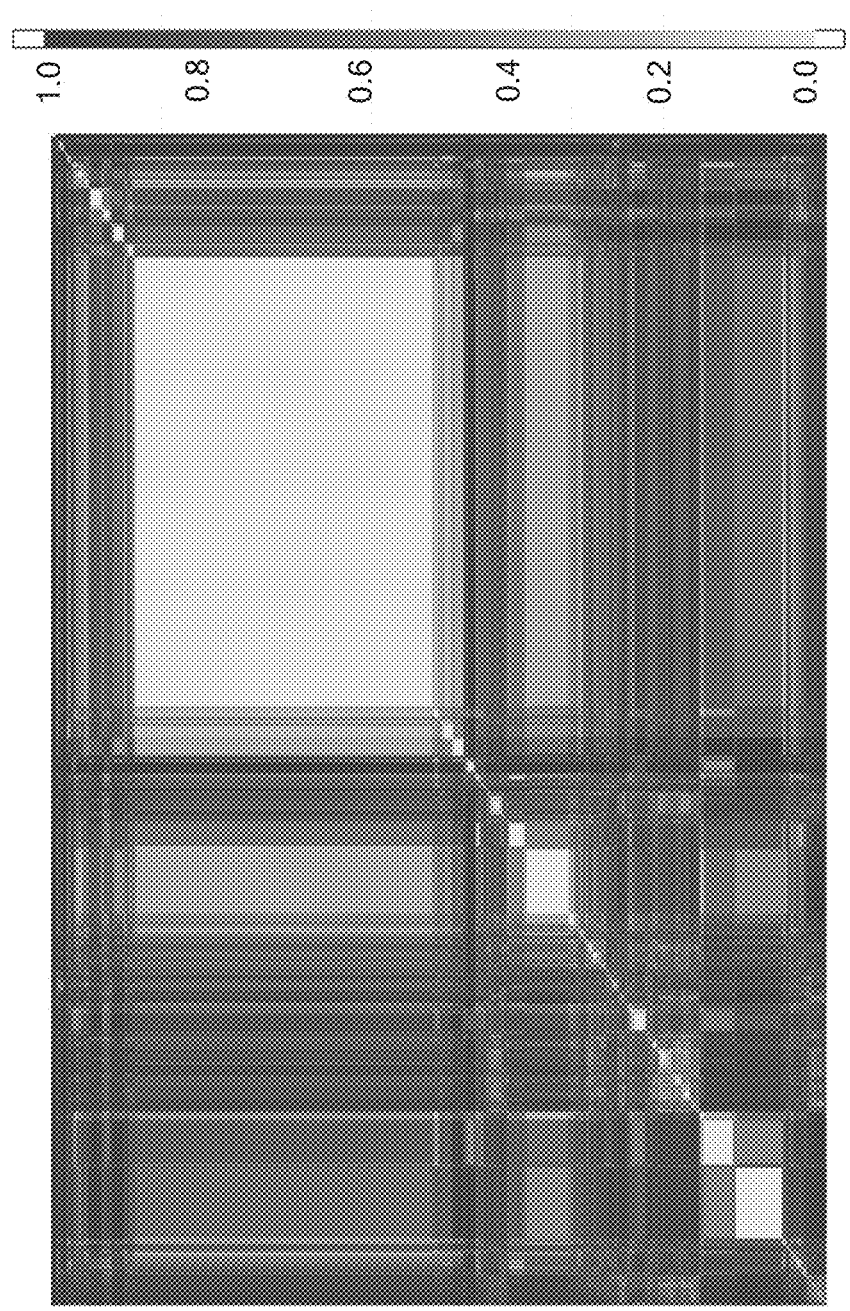
FIG. 6 shows a binary classification of the same patents based on the presence or absence of IPC group classification codes (1,078) assigned to each.

FIG. 6 shows a binary classification of the same patents based on the presence or absence of IPC group classification codes (1,078) assigned to each. Similarity was estimated by the Jaccard coefficient and the matrix was reordered by single-linkage clustering along both axes prior to visualization. The high number of off-diagonal bands appearing in the heatmaps indicates that many of the groups are overlapping and not particularly informative.

Figure 7:
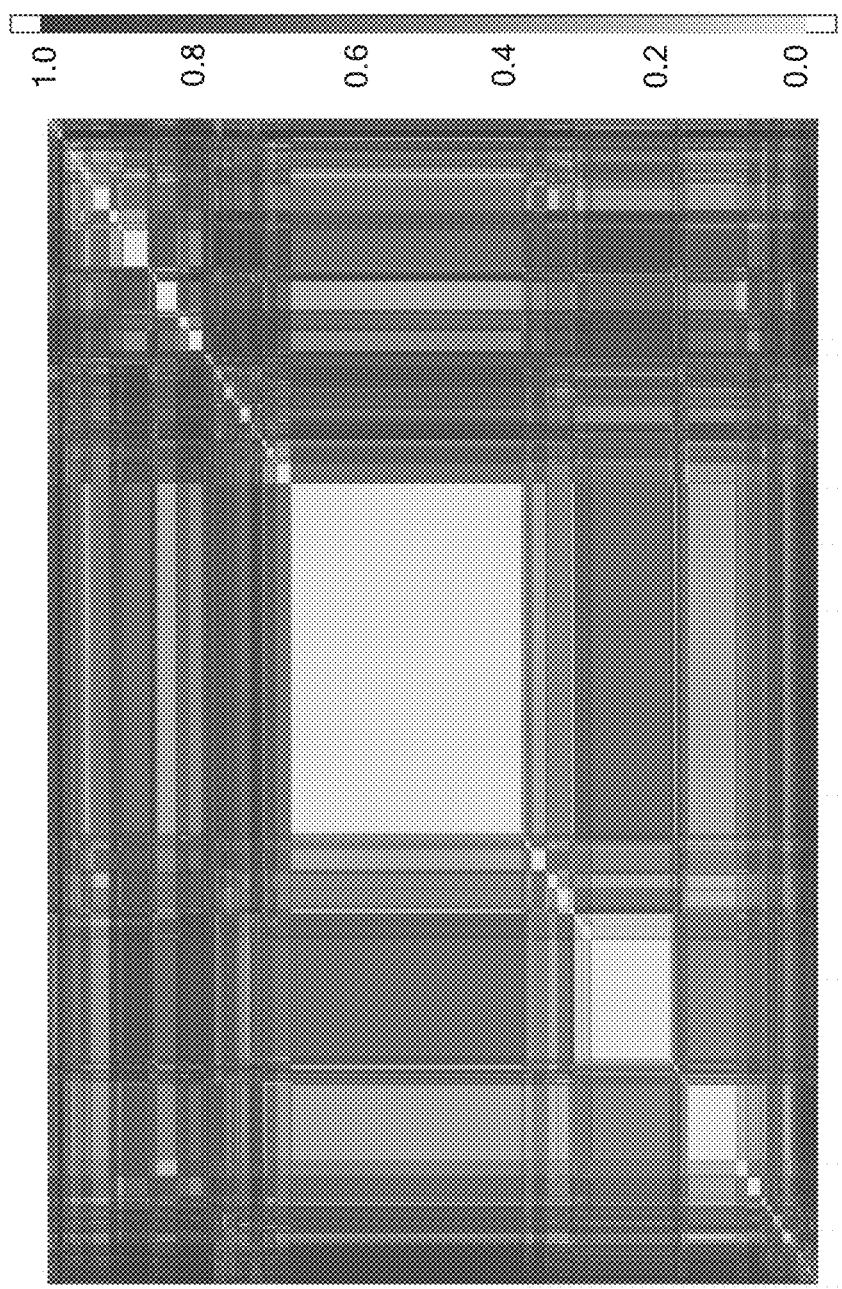
FIG. 7 shows a binary classification of the same patents using ECLA group codes (631).

FIG. 7 shows a binary classification of the same patents using ECLA group codes (631). Similarity was estimated by the Jaccard coefficient and the matrix was reordered by single-linkage clustering along both axes prior to visualization.

Figure 8:
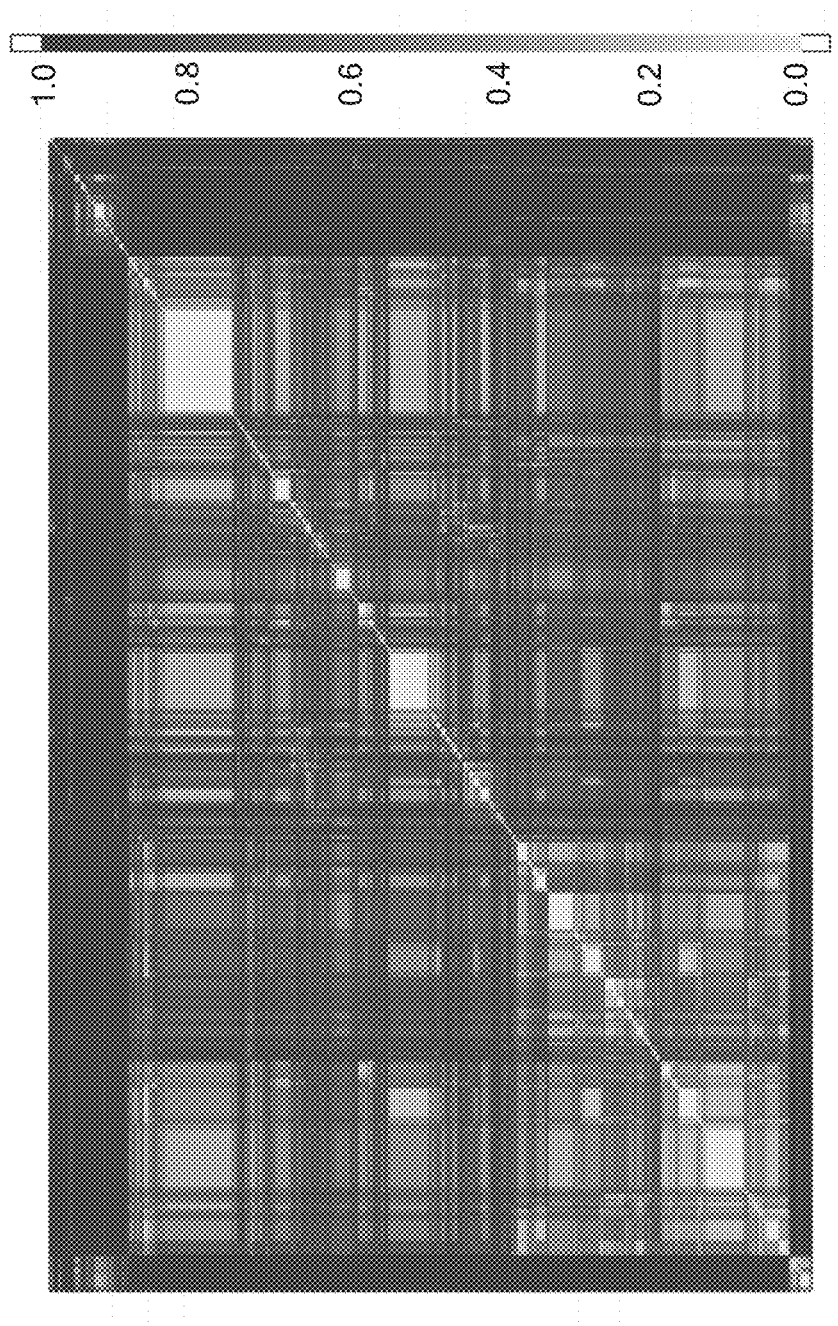
FIG. 8 shows a binary classification of the patents vs. IPC codes following removal of patents with only a single bacterial or archaeal name appearing in the text.

FIG. 8 shows a binary classification of the patents vs. IPC codes following removal of patents with only a single bacterial or archaeal name appearing in the text. Similarity was estimated by the Jaccard coefficient and the matrix was reordered by single-linkage clustering along both axes prior to visualization.

Figure 9:
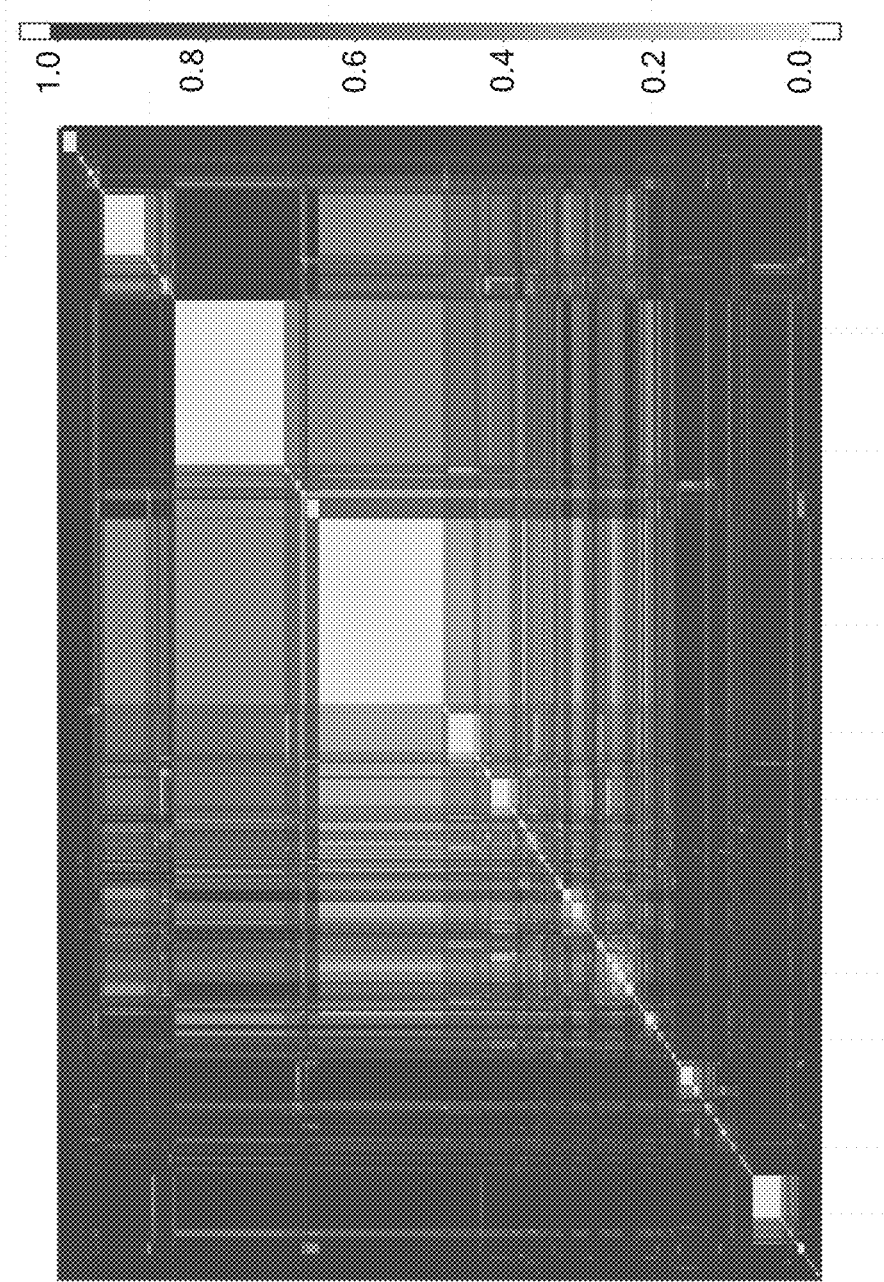
FIG. 9 shows a binary classification of the patents vs. ECLA codes following removal of patents with only a single bacterial or archaeal name appearing in the text.

FIG. 9 shows a binary classification of the patents vs. ECLA codes following removal of patents with only a single bacterial or archaeal name appearing in the text. Similarity was estimated by the Jaccard coefficient and the matrix was reordered by single-linkage clustering along both axes prior to visualization.

Thus, it can be seen that agglomerative cluster analysis of individual similarity matrices (patent vs. organism FIG. 5, patent vs. IPC code FIG. 6 and FIG. 8, patent vs. ECLA code FIG. 7 and FIG. 9) rendered non-predictive groupings of documents.

Figure 10:
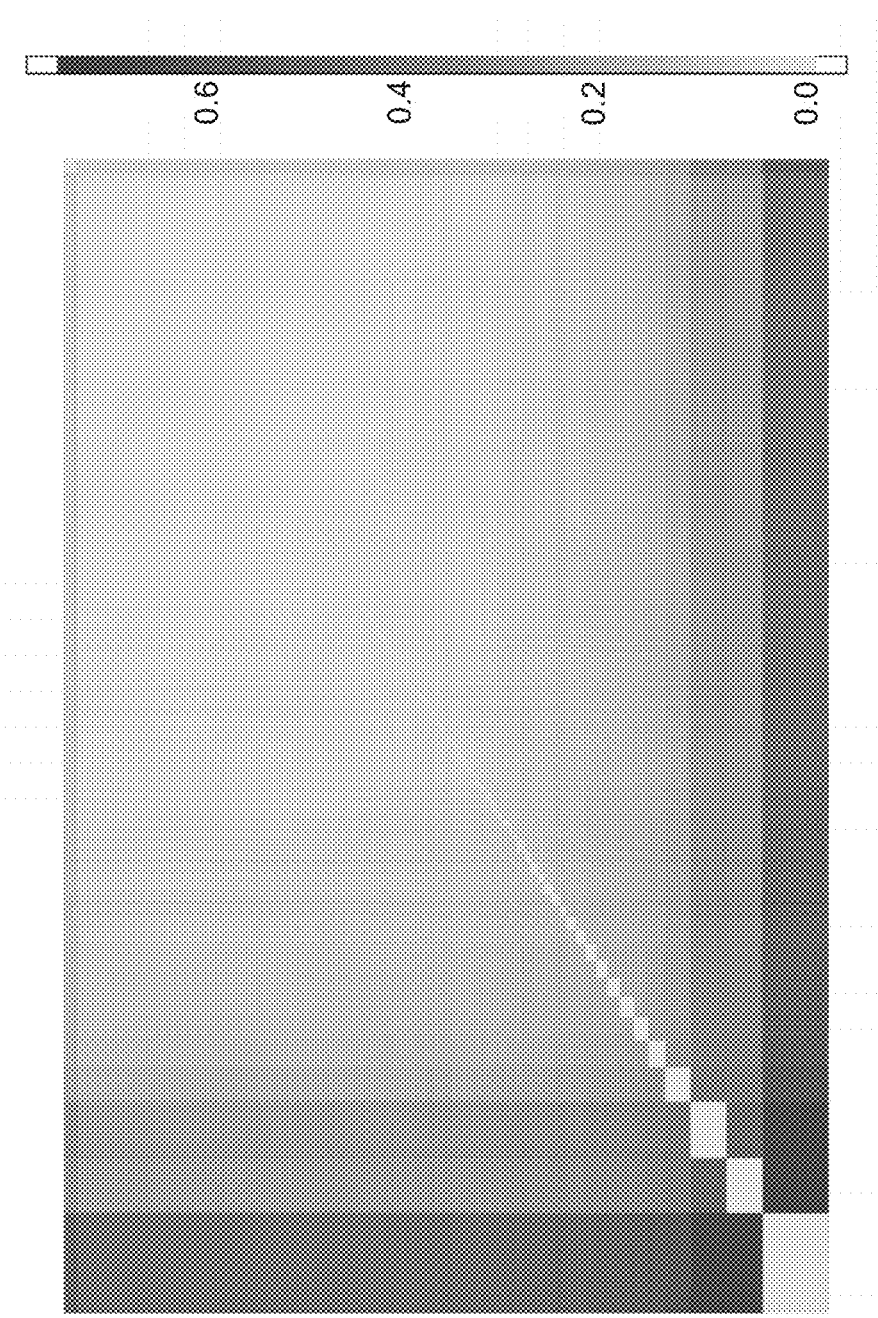
FIG. 10 shows a heatmap of a second-order dissimilarity matrix representing the matrix multiplication product of the dissimilarity matrix in FIG. 5 (following removal of singletons) and the dissimilarity matrix shown in FIG. 8.

However, meaningful results were achieved when a compound classification was applied, based on both the names (i.e. Bacteria or Archaea names) and patent classification (FIG. 10). This was initially accomplished by creating an intermediate hierarchical classification scheme, but this proved unnecessary as comparable results could be obtained by simple matrix operations (addition or multiplication of the similarity matrices) followed by a round of agglomerative clustering (FIG. 4 Table 430). The matrix was reordered by single-linkage clustering along both axes prior to visualization. The resulting vector of patent identifiers was then used to order all of the associated metadata from the document server (103) and provided in tabular format for review by the end user on the device of their choice (113). This approach to analysis of patents, in which an externally managed nomenclature/terminology was applied in conjunction with established indexing methods yielded vastly superior results to those that could be achieved by using either full text search methods (VSM or non-VSM based on prior art) or document classification methods based on keywords or other classifiers such as the IPC and ECLA codes.

Figure 11:
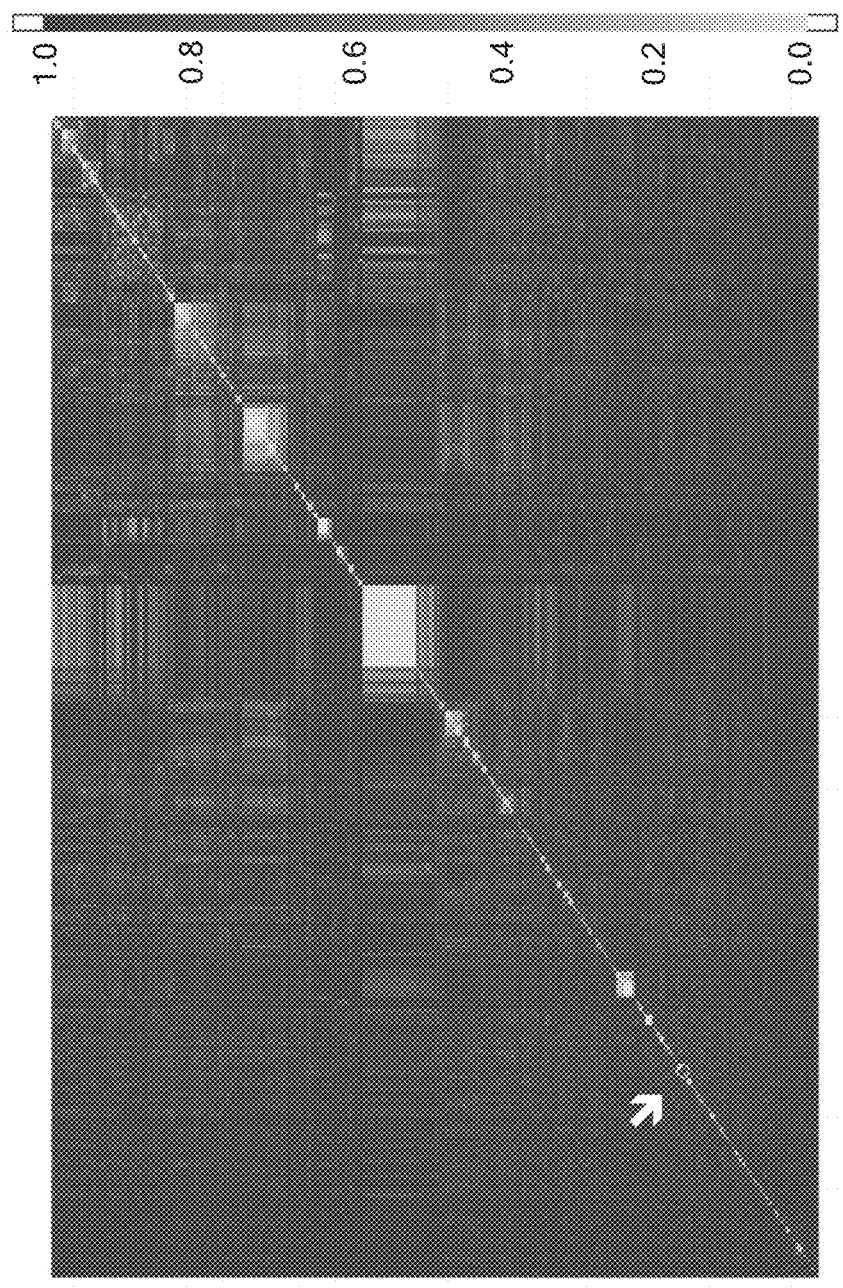
FIG. 11 shows a heatmap of a dissimilarity matrix of patents vs. names to which a new patent has been added.
Figure 12:
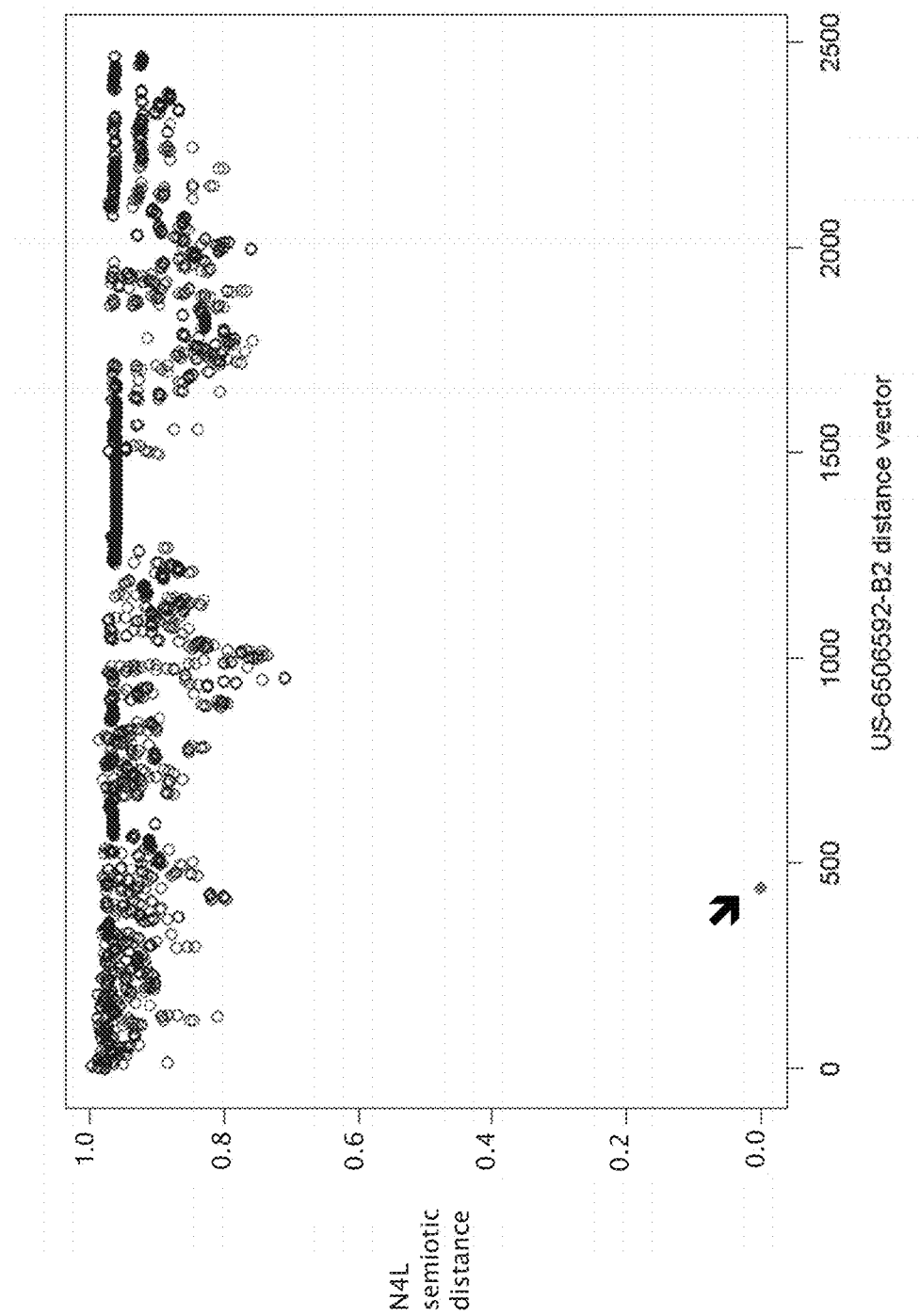
FIG. 12 shows the values of the semiotic similarity between the new patents and the other patents, based on the organism names.

A three-way analysis of U.S. Pat. No. 6,506,592-B2, which was not included in the EPO green technology collection, was carried out to determine which, if any patents in that collection might be similar. The first analysis compared the "semiotic fingerprint" of the patent with the "fingerprints" of all other patents that shared at least one name in common with U.S. Pat. No. 6,506,592-B2. A total of 2,468 documents met this criterion. These documents were clustered based on name content and the resulting distance matrix was projected as a heatmap (FIG. 11). Similarity was estimated by the Jaccard coefficient and the matrix was reordered by single-linkage clustering along both axes prior to visualization. The location of U.S. Pat. No. 6,506,592-B2 is highlighted by the white circle in FIG. 11 (see arrow). U.S. Pat. No. 6,506,592-B2 does not appear to group with any of the green technology patents. The distance vector for U.S. Pat. No. 6,506,592-B2 was extracted and plotted separately (FIG. 12), which confirms that the semiotic fingerprint of this patent is quite distinctive, at least within the set of patents used in the analysis (U.S. Pat. No. 6,506,592-B2 is the solid data point near the bottom of the plot located at the Cartesian coordinate (0, 480) (see arrow)).

Figure 13:
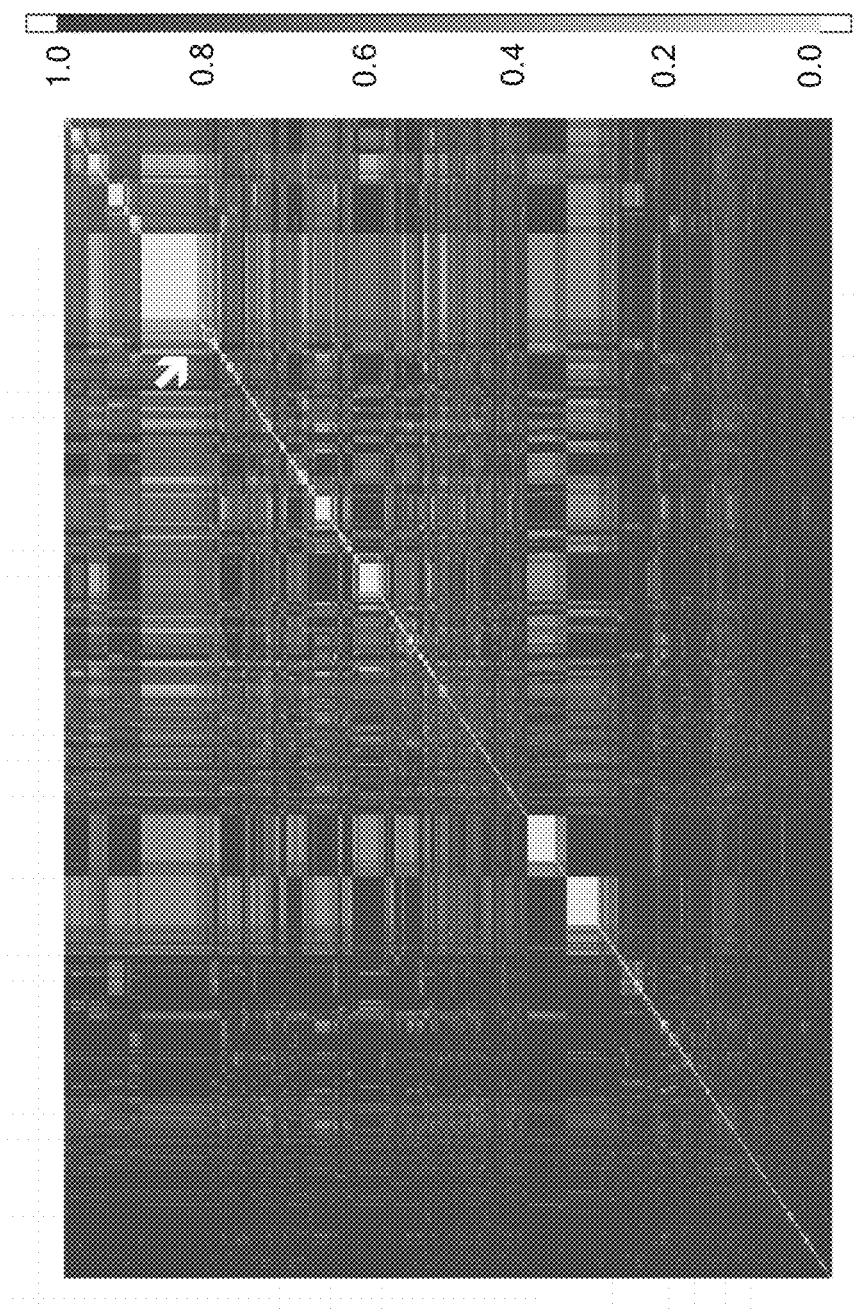
FIG. 13 shows a heatmap of a dissimilarity matrix of patents vs. IPC codes to which a new patent has been added.
Figure 14:
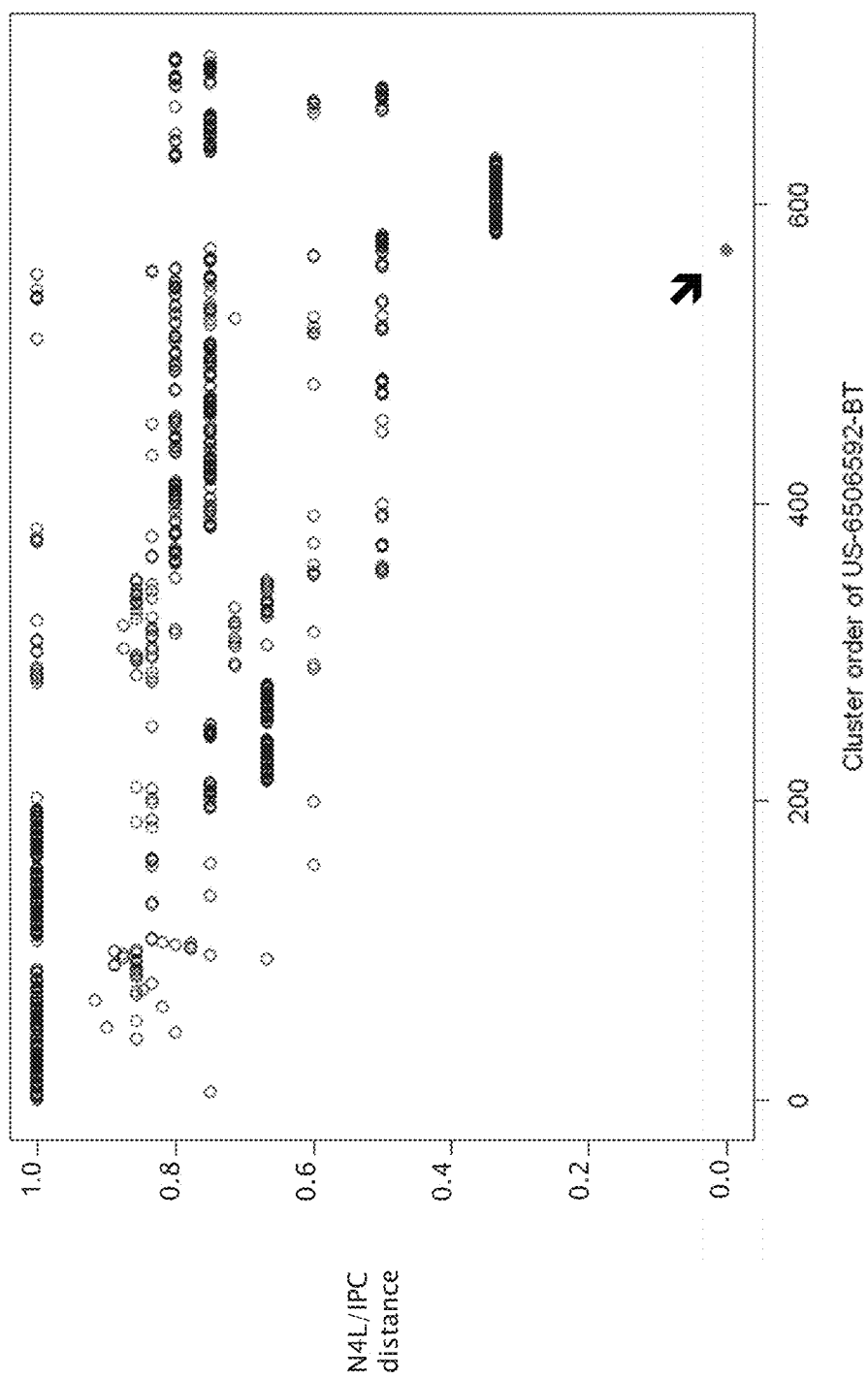
FIG. 14 shows the values of the semiotic similarity between the new patent and the other patents, based on the bacterial and archaeal names contained in the document.

The second analysis was performed by examining document fingerprints based on the International Patent Classifications (IPC code). Selection of the patents in this subset was done in a similar manner to that described above, based on the presence of at least one overlapping IPC code in each patent included in the analysis with U.S. Pat. No. 6,506,592-B2. Since IPC codes are not assigned to every patent or patent application, the data set is smaller (700 documents). FIG. 13 is the corresponding heatmap with the location of U.S. Pat. No. 6,506,592-B2 highlighted. Position of that patent within the matrix is at the position of the white circle along the diagonal in the upper right quadrant of the matrix (see arrow). Similarity was estimated by the Jaccard coefficient and the matrix was reordered by single-linkage clustering along both axes prior to visualization. FIG. 14 is the extracted distance vector, with the location of U.S. Pat. No. 6,506,592-B2 highlighted in as a solid data point. FIG. 14 shows the values of the semiotic similarity between the new patent and the other patents, based on the organism names. The newly added patent is represented by the solid gray point located at the Cartesian coordinate (0, 590) (see arrow). Note the Y-dimension (number of patents) in this matrix is shorter as the number of patents available with at least one code in common was fewer than in previous examples. Note that the IPC classification (the technology fingerprint) shows a greater number of patents as being closely related to U.S. Pat. No. 6,506,592-B2 than were found with the semiotic fingerprint.

Figure 15:
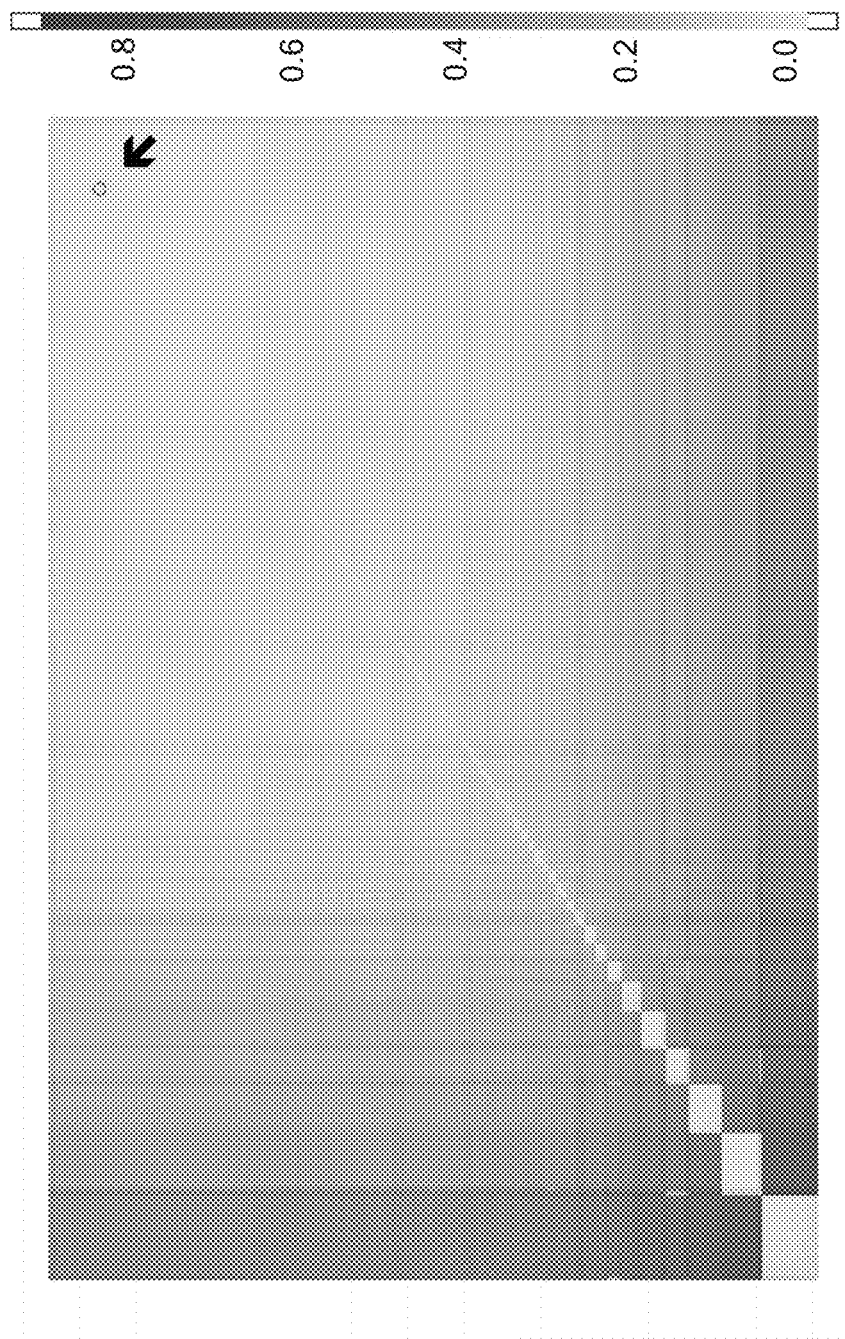
FIG. 15 shows a heatmap of a second-order dissimilarity matrix representing the matrix multiplication product of the regions in similarity matrices in FIG. 11 and FIG. 14 that were in common along the patent vector.
Figure 16:
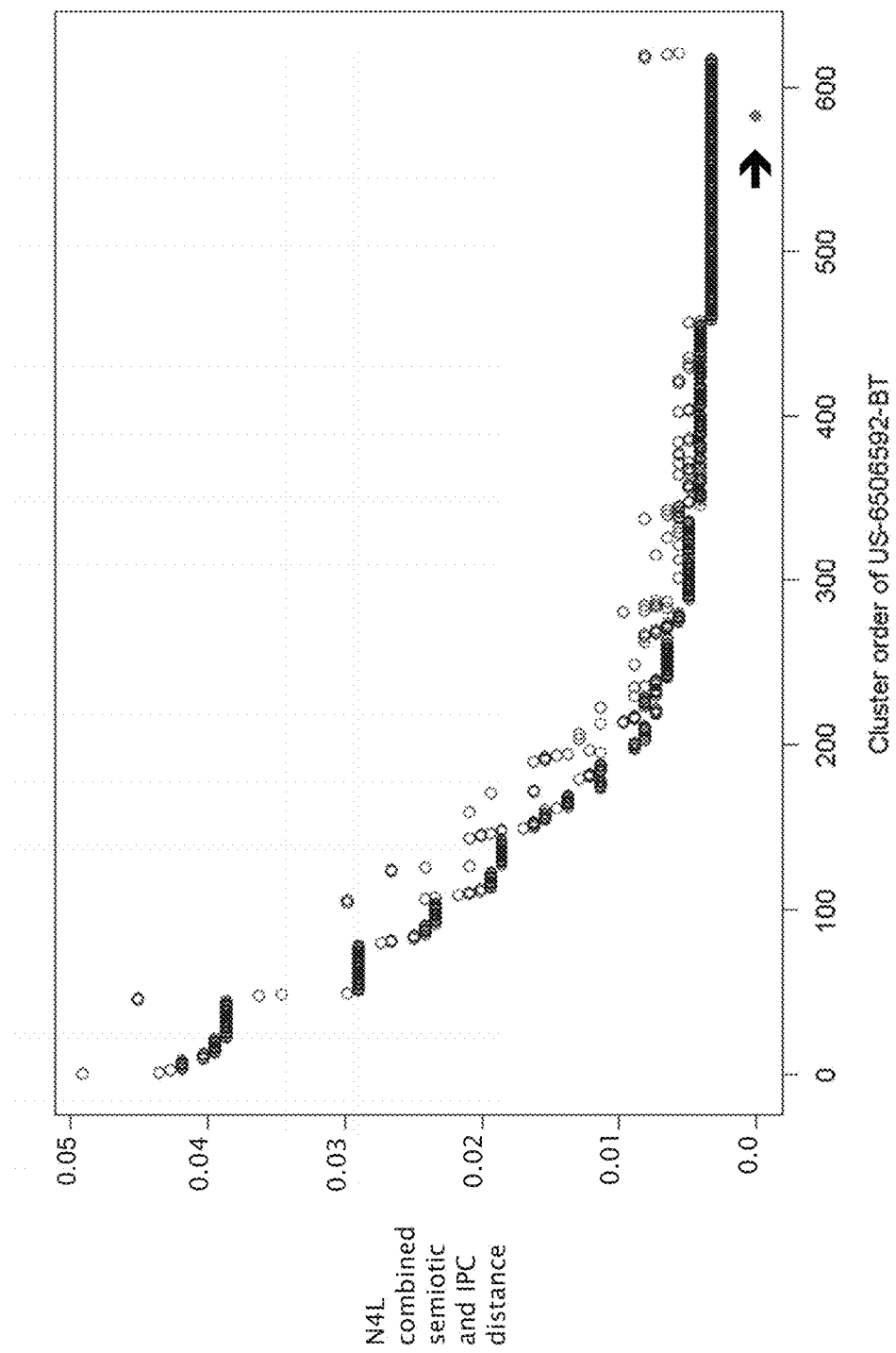
FIG. 16 shows the values of the second-order similarity scores between the new patent and the other patents, based on the product of semiotic similarity and ECLA similarity.

The third analysis uses a combined semiotic and technological fingerprint of the patents (621 documents) that was created based on the product of the name dissimilarity matrix (the semiotic fingerprint) and technology dissimilarity matrix. As before, this method provides a very high-resolution grouping of patents, as is evidenced by the exceptionally smooth and highly ordered appearance of the heatmap. To avoid unintentional weighting based on different lengths of the semiotic and technology vectors, we combine distance matrices from the above analyses and compute a derived or second-order distance. The heatmap is shown in FIG. 15 with the corresponding extracted distance vector in FIG. 16. FIG. 15 shows a heatmap of a second-order dissimilarity matrix representing the entrywise matrix multiplication product of the regions in similarity matrices in FIGS. 11 and FIG. 14 that were in common along the patent vector. The matrix was reordered by single-linkage clustering along both axes prior to visualization. Position of the newly added patent within the matrix is at the position of the black circle along the diagonal in the upper right quadrant of the matrix (see arrow). FIG. 16 shows the values of the second order similarity scores between the new patent and the other patents, based on the entrywise product of semiotic similarity and ECLA similarity. The newly added patent is represented by the solid gray point located at Cartesian coordinate (0, 590) (see arrow). As in the first embodiment, the resulting vector of patent identifiers, sorted in descending order starting with the patent in question, was then used to order all of the associated metadata from the document server (103) and provided in tabular format for review by the end-user on the device of their choice (113).

Based on this approach to document analysis it appears that the subject matter in U.S. Pat. No. 6,506,592-B2 is quite distinct from all other patents in the collection of green technology patents available at the time.

Application of VSMs in text analysis and information retrieval have proven to be useful in grouping together documents and other types of digital content based on the patterns of word-usage. However, to date, these approaches have suffered from two drawbacks when being implemented on a large scale. The first is a requirement for "training"; a process in which a subset of a corpus is tokenized (tokens are word-like strings that are the output of a lexical analyzer that are recognized based on the application of a set of grammar rules) and word frequencies are established. For the sake of computational performance the number of words is typically set to an arbitrary threshold (10, 100, 500) and a list of stop words is produced (non-informational words such as articles and conjunctions). Additional steps may also be taken to improve performance such as lemmatization, expansion of abbreviations and resolution of synonyms, polysemes, meronyms and hyponyms. Once training is completed, the analysis can proceed with documents of interest.

The second problem that affects VSMs is vector length. Ideally, each "word" in every document in a corpus should be included in the analysis. However, analytical techniques that rely on matrices or higher order tensors scale exponentially, and the matrices and higher tensors that arise from such applications tend to be sparse. These are computationally difficult problems that can become intractable, even with relatively small corpora. Filtering words algorithmically can provide a partial solution, as can methods for computing similarity values from sparse matrices, but this approach does not overcome the requirement for training.

Here, we provide a novel solution to this problem. Rather than using a vector of words or terms that is recovered from a corpus, we employ an externally managed terminology (e.g., biological names of Bacteria and Archaea) as a selective filter to locate all relevant documents from a corpus. We also apply additional externally managed filters to the collection of documents that were retrieved (e.g., IPC and ECLA codes). Second-order similarity among the documents recovered is then computed first by estimating similarity based on each of the individual vectors, then as a product of the resulting similarity vectors. This approach allows for the rapid grouping of large numbers of similar documents. By application of additional externally managed terminologies, subsets of documents, based on unions of the term sets and other classifiers applied, could be used to quickly narrow a search space, even as the number of documents continues to increase.

Insofar as the terminology applied in this embodiment fully complies with generally accepted models of semiotics (e.g., the nomenclature of Bacteria and Archaea from NamesforLife, LLC), it fully supports the retrieval of documents that use current or obsolete names for the same organisms (e.g., synonyms) or use the names of higher order taxa (hypernyms) or subordinate taxa (hyponyms). The same approach can be used as a "tunable" filter to retrieve documents that apply to groups of related organisms at any level within a taxonomic hierarchy. A similar strategy was applied using IPC and ECLA classifications, which are also hierarchical and could be applied to any terminology, subject language terminology, or nomenclature that is represented as a taxonomy or ontology.

Vectors of externally managed term sets also provide a means of solving the sparse matrix problem. When applied to large corpora as one or more filters, such vectors effectively reduce the semantic space to those terms that apply to a specific topic or intersection of two or more topics. By removing documents from consideration that do not contain any of the terms of interest, one is left a subset of documents that will contain a finite number of words, bounded at the upper limit by the product dimensionality of the size of the union of those sets of terms. However, the probability of any corpus containing all of the terms in multiple subject specific nomenclatures or terminologies is anticipated to be considerably less than the theoretical maximum.

Thus, the invention provides, among other things, a method and system for semiotically indexing digital resources. Various features and advantages of the invention are set forth in the following claims.

What is claimed is:

1. A method of classifying a plurality of documents, comprising:

providing a first set of classification terms and a second set of classification terms, the second set of classification terms being different from the first set of classification terms;

generating a first frequency array of a number of occurrences of each term from the first set of classification terms in each document;

generating a second frequency array of a number of occurrences of each term from the second set of classification terms in each document;
generating a first similarity matrix from the first frequency array;
generating a second similarity matrix from the second frequency array;
determining an entrywise combination of the first similarity matrix and the second similarity matrix; and
clustering the plurality of documents based on the result of the entrywise combination.

2. The method of claim 1, wherein the first set of classification terms comprises one of an externally managed set of terms and a patent classification code.

3. The method of claim 1, wherein the first set of classification terms comprises an externally managed set of terms.

4. The method of claim 3, wherein the externally managed set of terms has been disambiguated.

5. The method of claim 1, wherein the first set of classification terms comprises an externally managed set of classification terms for Bacteria and Archaea.

6. The method of claim 1, further comprising reordering metadata associated with the plurality of documents according to the clustering.

7. The method of claim 1, wherein clustering the documents comprises a hierarchical clustering method selected from the group consisting of: single linkage clustering, complete linkage clustering, group-average clustering, and centroid clustering.

8. The method of claim 1, wherein clustering the documents comprises a non-hierarchical method selected from the group consisting of: monothetic divisive clustering, minimization of trace clustering, multivariate mixture model clustering, Jardine and Sibsons's K-dend clustering, distribution-based model clustering, density based model clustering, partitioning based clustering, and Bayesian based clustering.

9. The method of claim 1, further comprising projecting the data as at least one of a heatmap and a hexagonal bin plot.

10. The method of claim 1, wherein the plurality of documents comprises patent documents.

11. The method of claim 1, wherein the plurality of documents comprises one of scientific, technical, medical, or legal literature.

12. The method of claim 1, wherein generating a first similarity matrix comprises generating a first similarity matrix using the Jaccard coefficient.

13. The method of claim 1, wherein the entrywise combination comprises at least one of multiplication, addition, subtraction, and division of the first similarity matrix and the second similarity matrix.

14. The method of claim 1, further comprising
providing a third set of classification terms, different from the first and second sets of classification terms;
generating a third frequency array of a number of occurrences of each term from the third set of classification terms in each document; and generating a third similarity matrix from the third frequency array;
wherein determining an entrywise combination of the first similarity matrix and the second similarity matrix further comprises determining an entrywise combination of the first similarity matrix, the second similarity matrix, and the third similarity matrix.

15. The method of claim 14, wherein the first, second, and third frequency arrays comprise an intersection of documents from the plurality of documents which have at least one term from each of the first, second, and third sets of classification terms.

16. The method of claim 1, wherein the first frequency array includes only documents having at least one term from the first set of classification terms.

17. The method of claim 16, wherein the second frequency array includes only documents having at least one term from the first set of classification terms.

18. The method of claim 1, wherein the second frequency array includes only documents having at least one term from the second set of classification terms.

19. The method of claim 1, wherein the first frequency array includes only documents having at least two different terms from the first set of classification terms.

20. The method of claim 19, wherein the second frequency array includes only documents having at least one term from the first set of classification terms.

21. The method of claim 1, wherein the plurality of documents comprises a digital resource.

22. The method of claim 1, wherein the first set of classification terms comprises an externally managed set of classification terms for organisms, chemicals, enzymes, genes, proteins, minerals, materials, trademarks, or trade names.

23. The method of claim 1, wherein the first set of classification terms comprises an externally managed set of classification terms comprising a computable terminology.

24. The method of claim 1, wherein at least one step is carried out using a microprocessor.

25. A computer-based system for classifying a plurality of documents, the system comprising:
a processor; and
a storage medium operably coupled to the processor, wherein the storage medium includes, program instructions executable by the processor for
providing a first set of classification terms and a second set of classification terms, the second set of classification terms being different from the first set of classification terms;
generating a first frequency array of a number of occurrences of each term from the first set of classification terms in each document;
generating a second frequency array of a number of occurrences of each term from the second set of classification terms in each document;
generating a first similarity matrix from the first frequency array;
generating a second similarity matrix from the second frequency array;
determining an entrywise combination of the first similarity matrix and the second similarity matrix; and
clustering the plurality of documents based on the result of the entrywise combination.

26. The computer-based system of claim 25, wherein the first set of classification terms comprises one of an externally managed set of terms and a patent classification code.

27. The computer-based system of claim 25, wherein the first set of classification terms comprises an externally managed set of terms.

28. The computer-based system of claim 27, wherein the externally managed set of terms has been disambiguated.

29. The computer-based system of claim 25, wherein the first set of classification terms comprises an externally managed set of classification terms for Bacteria and Archaea.

30. The computer-based system of claim 25, further comprising reordering metadata associated with the plurality of documents according to the clustering.

31. The computer-based system of claim 25, wherein clustering the documents comprises a hierarchical clustering method selected from the group consisting of: single linkage clustering, complete linkage clustering, group-average clustering, and centroid clustering.

32. The computer-based system of claim 25, wherein clustering the documents comprises a nonhierarchical method selected from the group consisting of: monothetic divisive clustering, minimization of trace clustering, multivariate mixture model clustering, Jardine and Sibsons's K-dend clustering, distribution-based model clustering, density based model clustering, partitioning based clustering, and Bayesian based clustering.

33. The computer-based system of claim 25, further comprising projecting the data as at least one of a heatmap and a hexagonal bin plot.

34. The computer-based system of claim 25, wherein the plurality of documents comprises patent documents.

35. The computer-based system of claim 25, wherein the plurality of documents comprises one of scientific, technical, medical, or legal literature.

36. The computer-based system of claim 25, wherein generating a first similarity matrix comprises generating a first similarity matrix using the Jaccard coefficient.

37. The computer-based system of claim 25, wherein the entrywise combination comprises at least one of multiplication, addition, subtraction, and division of the first similarity matrix and the second similarity matrix.

38. The computer-based system of claim 25, wherein the program instructions executable by the processor further comprise instructions for
  providing a third set of classification terms, different from the first and second sets of classification terms;
  generating a third frequency array of a number of occurrences of each term from the third set of classification terms in each document; and
  generating a third similarity matrix from the third frequency array;
  wherein determining an entrywise combination of the first similarity matrix and the second similarity matrix further comprises determining an entrywise combination of the first similarity matrix, the second similarity matrix, and the third similarity matrix.

39. The computer-based system of claim 38, wherein the first, second, and third frequency arrays comprise an intersection of documents from the plurality of documents which have at least one term from each of the first, second, and third sets of classification terms.

40. The computer-based system of claim 25, wherein the first frequency array includes only documents having at least one term from the first set of classification terms.

41. The computer-based system of claim 40, wherein the second frequency array includes only documents having at least one term from the first set of classification terms.

42. The computer-based system of claim 25, wherein the second frequency array includes only documents having at least one term from the second set of classification terms.

43. The computer-based system of claim 25, wherein the first frequency array includes only documents having at least two different terms from the first set of classification terms.

44. The computer-based system of claim 43, wherein the second frequency array includes only documents having at least one term from the first set of classification terms.

45. The computer-based system of claim 25, wherein the plurality of documents comprises a digital resource.

46. The computer-based system of claim 25, wherein the first set of classification terms comprises an externally managed set of classification terms for organisms, chemicals, enzymes, genes, proteins, minerals, materials, trademarks, or trade names.

47. The computer-based system of claim 25, wherein the first set of classification terms comprises an externally managed set of classification terms comprising a computable terminology.

48. The computer-based system of claim 25, wherein at least one step is carried out using a microprocessor.

* * * * *